United States Patent
Li et al.

(10) Patent No.: US 11,536,798 B2
(45) Date of Patent: Dec. 27, 2022

(54) CONTROL OF RANGING INITIATORS AND RESPONDERS IN AN UWB NETWORK

(71) Applicant: Samsung Electronics Co., Ltd., Suwon-si (KR)

(72) Inventors: Zheda Li, Plano, TX (US); Aditya V. Padaki, Richardson, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 16/719,759

(22) Filed: Dec. 18, 2019

(65) Prior Publication Data

US 2020/0200862 A1 Jun. 25, 2020

Related U.S. Application Data

(60) Provisional application No. 62/864,746, filed on Jun. 21, 2019, provisional application No. 62/854,017, filed on May 29, 2019, provisional application No. 62/850,242, filed on May 20, 2019, provisional application No. 62/822,357, filed on Mar. 22, 2019, provisional application No. 62/813,428, filed on Mar. 4, 2019, provisional application No. 62/784,044, filed on Dec. 21, 2018.

(51) Int. Cl.
*G01S 5/14* (2006.01)
*H04W 74/02* (2009.01)
*H04W 4/029* (2018.01)
*G01S 5/02* (2010.01)

(52) U.S. Cl.
CPC ............ *G01S 5/145* (2013.01); *G01S 5/0289* (2013.01); *H04W 4/029* (2018.02); *H04W 74/02* (2013.01)

(58) Field of Classification Search
CPC ...... G01S 5/145; G01S 5/0289; G01S 5/0226; G01S 5/0221; G01S 11/02; G01S 13/74; G01S 13/0209; G01S 13/08; H04W 4/029; H04W 4/023; H04W 74/02; H04W 64/00; H04W 92/18
See application file for complete search history.

(56) References Cited

U.S. PATENT DOCUMENTS

2017/0251449 A1 8/2017 Malik et al.
2020/0100283 A1* 3/2020 Naguib ............... H04W 56/001

FOREIGN PATENT DOCUMENTS

WO 2018048775 A2 3/2018

OTHER PUBLICATIONS

Jack Lee et al., IEEE 802.15.4z MAC for Ranging, Dec. 18, 2018, pp. 1-68 (Year: 2018).*

(Continued)

*Primary Examiner* — Farid Seyedvosoghi

(57) ABSTRACT

A method and transmit/receive apparatus in a wireless communication system supporting ranging capability are provided. The method and the transmit/receive apparatus comprises: identifying ranging apparatuses; identifying a ranging control message (RCM) including a ranging device management information element (RDM IE) and roles of the ranging apparatuses, the RDM IE including a content field, wherein the ranging apparatuses include the transmit apparatus and at least one receive apparatus; and transmitting, to the ranging apparatuses over a broadcast channel, the RCM including the RDM IE in a ranging round (RR).

26 Claims, 31 Drawing Sheets

(56) References Cited

OTHER PUBLICATIONS

Aymen Naguib, MAC for Secure Ranging, Nov. 12, 2018, pp. 1-15 (Year: 2018).*
International Search Report and Written Opinion of the International Searching Authority in connection with International Application No. PCT/KR2019/018241 dated Apr. 2, 2020, 11 pages.
Lee, Jack, et al., "IEEE 802.15.4z MAC for Ranging," 15-18-0621-00-004z, Dec. 20, 2018, 68 pages.
Naguib, Ayman, et al., "MAC for Secure Ranging," 15-18-0540-00-004z, Nov. 11, 2018, 15 pages.
Verso, Billy, "Ranging procedures and messages," IEEE P802.15-18-0599-00-004z, Nov. 14, 2018, 25 pages.
"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.
"IEEE Standard for Low-Rate Wireless Networks", IEEE Computer Society, IEEE Std 802.15.4TM, Dec. 2015, 708 pages.
Supplementary European Search Report dated Dec. 7, 2021, in connection with European Application No. 19897781.1, 8 pages.

* cited by examiner

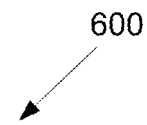
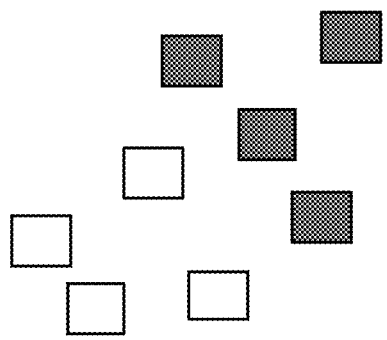
FIG. 6

| Octets: 1 | Bits: 1 | Octets: 0/2/6/8 | Bits: 0/1 |
|---|---|---|---|
| Slot index | Presence of address and device type | Device ID/MAC address | 0: responder<br>1: initiator |

| Bit: 0 | 1 | 2~7 | Octets: 0/2/6/8 |
|---|---|---|---|
| 0: responder<br>1: initiator | Address Present | Reserved | Address field |

FIG. 28

| Bit: 0 | 1~7 | Variable |
|---|---|---|
| Address Present | RIRL Table Length | RIRL Table |

FIG. 29

| Octets: 1 | Variable | Bits: 1 |
|---|---|---|
| RIRL Table Length | RIRL Table | 0: responder<br>1: initiator |

FIG. 30

| Octets: 0/2/6/8 |
|---|
| Address field |

| Bit: 0 | 1 | 2~7 | Octets: 2/8 |
|---|---|---|---|
| Address Type | 0: responder<br>1: initiator | Slot index | Device ID/MAC address |

| Bit: 0 | 1 | 2~7 | Octets: 1 | Octets: 2/8 |
|---|---|---|---|---|
| Address Type | Device Type | Reserved | Slot index | Device ID/MAC address |

| Bit: 0 | 1 | 2 | 3~7 | Octets: 1 | Octets: 0/2/8 |
|---|---|---|---|---|---|
| Address Presence | Address Type | Device Type | Reserved | Slot index | Device ID/MAC address |

4000

| Bit: 0 | 1 | 2 ~ 7 | Octets: 2/8 |
|---|---|---|---|
| Address Type | Device Type | Reserved | Address Field |

FIG. 41

| Bit: 0 | 1 | 2 | 3~7 | Octets: 0/2/8 |
|---|---|---|---|---|
| Address Presence | Address Type | Device Type | Reserved | Address field |

FIG. 42

| Bit: 0 | 1~7 | Variable |
|---|---|---|
| SIP | RDC Table Length | RDC Table |

| Bit: 0 | 1~7 | Octets: 0/1 | Octets: 0/2/8 |
|---|---|---|---|
| Device Type | Reserved | Slot index | Device ID/MAC address |

| Bits:1 | 1 | 6 | 0/2 | 0/2 | 0/2 | 0/1 | 0/1 | 0/1 | 0/6 | 0/6 | 0/3 |
|---|---|---|---|---|---|---|---|---|---|---|---|
| ARCP | RDCP | Reserved | Multi-node Mode | Ranging Method | STS Packet Config | Schedule Mode | Deferred Mode | Time Structure Indicator | Block Length Multiplier | Number of Active Ranging Rounds | Reserved |

| Octets:0/2 | 0/2 | 0/2 | Bits: 0/1 | 0/7 | Octets: 0/Variable |
|---|---|---|---|---|---|
| Minimum Block Duration | Ranging Round Length | Ranging Slot Length | SIP | RDC Table Length | RDC Table |

4900

5100

| Bits: 1 | 1 | 5 | 0/2 | 0/2 | 0/2 | 0/1 | 0/1 | 0/1 | 0/6 | 0/6 | 0/3 |
|---|---|---|---|---|---|---|---|---|---|---|---|
| ARCP | RDCP | Reserved | Multi-node Mode | Ranging Method | STS Packet Config | Schedule Mode | Deferred Mode | Time Structure Indicator | Block Length Multiplier | Number of Active Ranging Rounds | Reserved |

| Octets: 0/2 | 0/2 | 0/2 | Bits: 0/1 | 0/1 | 0/6 | Octets: 0/1 | Octets: 0/Variable |
|---|---|---|---|---|---|---|---|
| Minimum Block Duration | Ranging Round Length | Ranging Slot Length | SIP | AP | Reserved | RDC Table Length | RDC Table |

| Bit: 0 | 1~7 | Octets: 2/8 |
|---|---|---|
| Device Type | Slot Index/Reserved | Device ID/MAC address |

FIG. 52

CONTROL OF RANGING INITIATORS AND RESPONDERS IN AN UWB NETWORK

CROSS-REFERENCE TO RELATED APPLICATIONS AND CLAIM OF PRIORITY

The present application claims priority to:
U.S. Provisional Patent Application Ser. No. 62/784,044 filed on Dec. 21, 2018;
U.S. Provisional Patent Application Ser. No. 62/813,428 filed on Mar. 4, 2019;
U.S. Provisional Patent Application Ser. No. 62/822,357 filed on Mar. 22, 2019;
U.S. Provisional Patent Application Ser. No. 62/850,242 filed on May 20, 2019;
U.S. Provisional Patent Application Ser. No. 62/854,017 filed on May 29, 2019; and
U.S. Provisional Patent Application Ser. No. 62/864,746 filed on Jun. 21, 2019.

The content of the above-identified patent documents is incorporated herein by reference.

TECHNICAL FIELD

The present disclosure relates generally to ranging operation in a wireless communication system. In particular, a control of ranging initiators and responders in an UWB network is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide a control of ranging initiators and responders in an UWB network.

In one embodiment, a transmit apparatus in a wireless communication system supporting ranging capability is provided. The transmit apparatus comprises a processor configured to: identify ranging apparatuses; and identify a ranging control message (RCM) including a ranging device management information element (RDM IE) and roles of the ranging apparatuses, the RDM IE including a content field, wherein the ranging apparatuses include the transmit apparatus and at least one receive apparatus. The transmit apparatus further comprises a transceiver operably connected to the processor, the transceiver configured to transmit, to the ranging apparatuses over a broadcast channel, the RCM including the RDM IE in a ranging round (RR).

In another embodiment, a receive apparatus in a wireless communication system supporting ranging capability is provided. The receive apparatus comprises a transceiver configured to receive, from a transmit apparatus, a ranging control message (RCM) including a ranging device management information element (RDM IE) in a ranging round (RR). The receive apparatus further comprises a processor operably connected to the transceiver, the processor configured to: identify ranging apparatuses; and identify the RCM including the RDM IE and roles of the ranging apparatuses, the RDM IE including a content field, wherein the ranging apparatuses includes the transmit apparatus and a group of receive apparatus including the receive apparatus.

In yet another embodiment, a method of a transmit apparatus in a wireless communication system supporting ranging capability is provided. The method comprises: identifying ranging apparatuses; identifying a ranging control message (RCM) including a ranging device management information element (RDM IE) and roles of the ranging apparatuses, the RDM IE including a content field, wherein the ranging apparatuses include the transmit apparatus and at least one receive apparatus; and transmitting, to the ranging apparatuses over a broadcast channel, the RCM including the RDM IE in a ranging round (RR).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example many-to-many scenario according to embodiments of the present disclosure;

FIG. 28 illustrates yet another example row of RIRL table according to embodiments of the present disclosure;

FIG. 29 illustrates an example content fields of ranging initiator/responder list (RIRL) IE according to embodiments of the present disclosure;

FIG. 30 illustrates another example content fields of ranging initiator/responder list (RIRL) IE according to embodiments of the present disclosure;

FIG. 31 illustrates an example row of RIRL table according to embodiments of the present disclosure;

FIG. 38 illustrates an example revised row of RS table according to embodiments of the present disclosure;

FIG. 39 illustrates another example revised row of RS table according to embodiments of the present disclosure;

FIG. 40 illustrates yet another example revised row of RS table according to embodiments of the present disclosure;

FIG. 41 illustrates an example revised row/element of RIRL table according to embodiments of the present disclosure;

FIG. 42 illustrates another example revised row/element of RIRL table according to embodiments of the present disclosure;

FIG. 43 illustrates an example content fields of ranging device control (RDC) IE according to embodiments of the present disclosure;

FIG. 48 illustrates an example row/element of RDC table without address type field according to embodiments of the present disclosure;

FIG. 49 illustrates an example content field format of ARC IE with fields of RDC IE according to embodiments of the present disclosure;

FIG. 51 illustrates an example content field format of ARC IE with fields of RDC IE according to embodiments of the present disclosure;

FIG. 52 illustrates an example row element of RDC table with one octet to indicate device type and slot index according to embodiments of the present disclosure.

DETAILED DESCRIPTION

Figure 1:
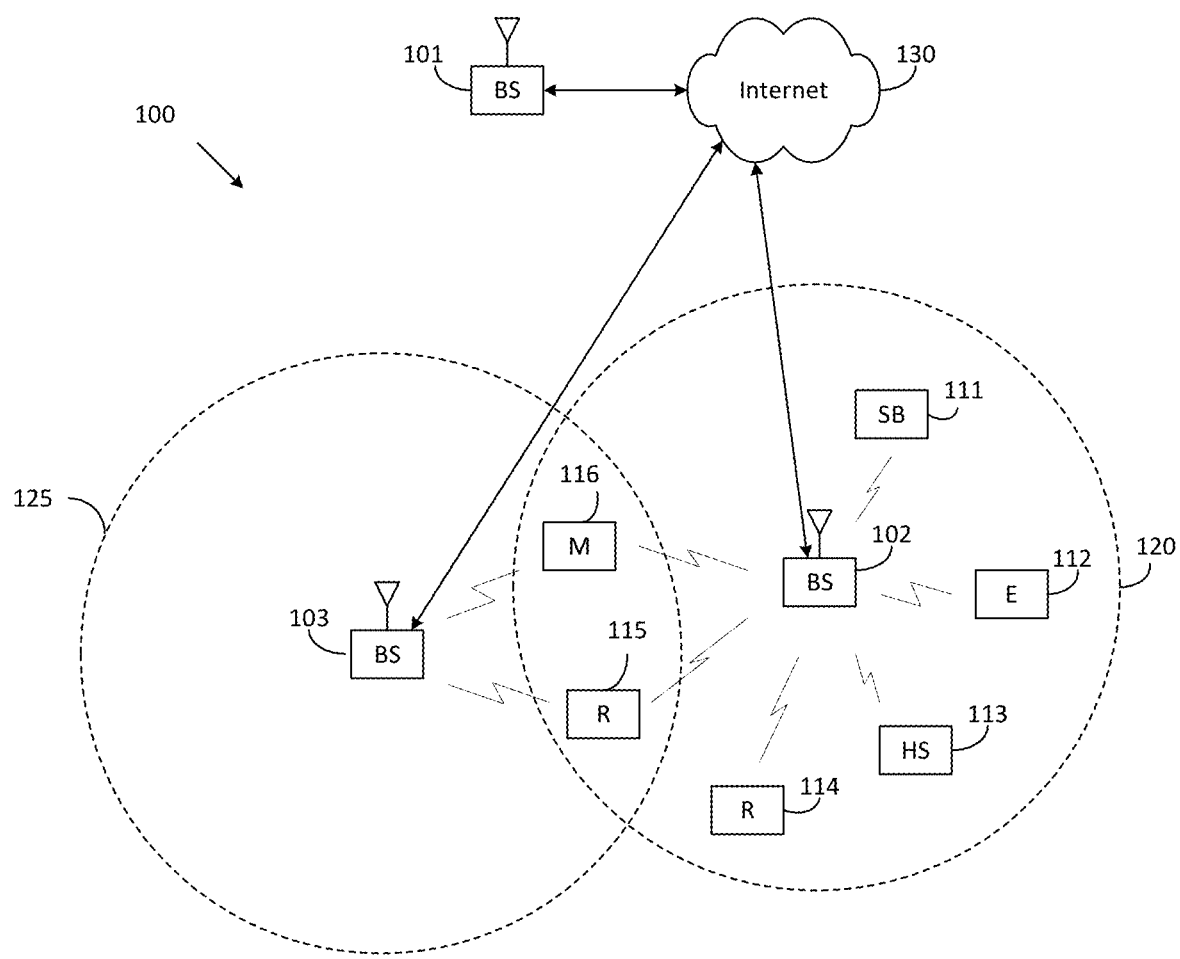
FIG. 1 illustrates an example wireless network according to embodiments of the present disclosure.
Figure 53:
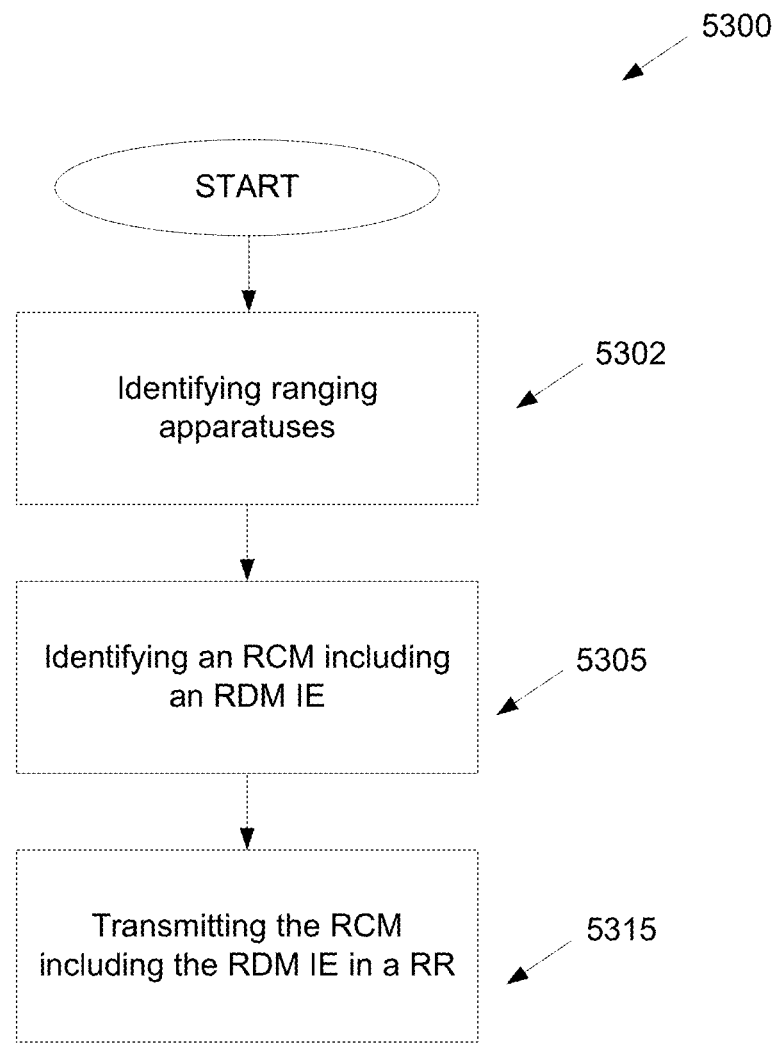
FIG. 53 illustrates a flowchart of a method for controlling a ranging operation according to embodiments of the present disclosure.

FIGS. 1 through FIG. 53, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 2:
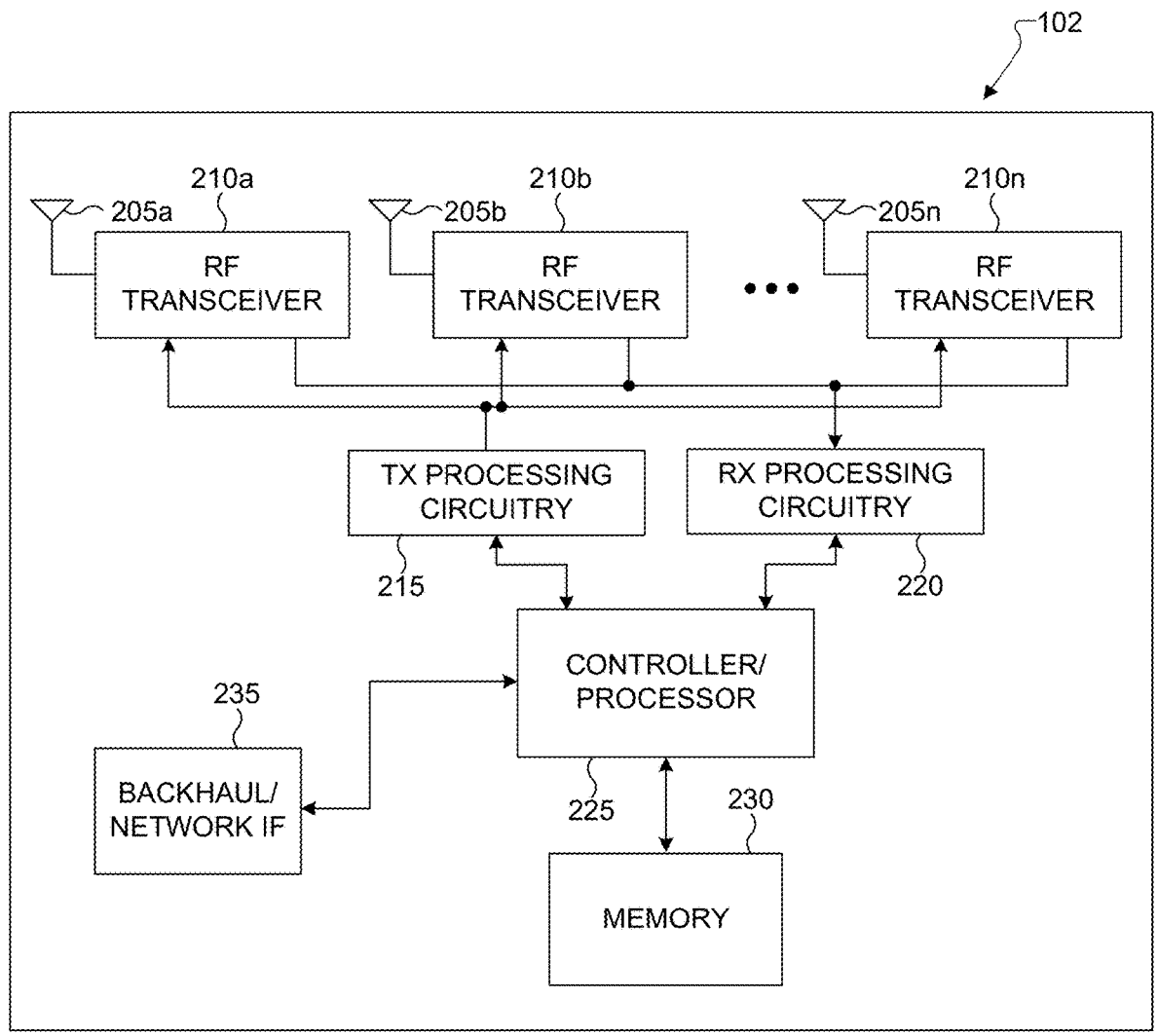
FIG. 2 illustrates an example gNB according to embodiments of the present disclosure.
Figure 3:
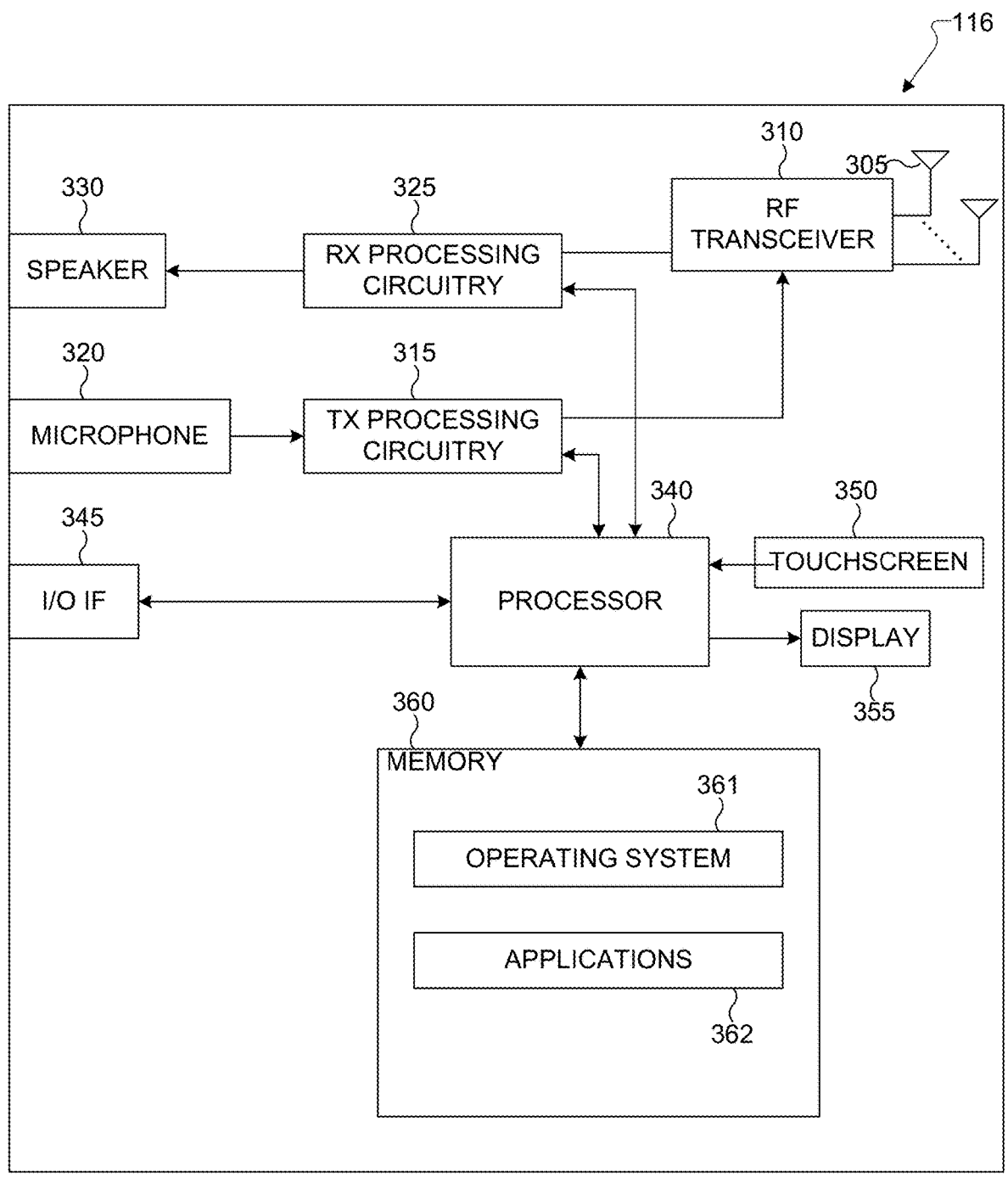
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for CSI reporting in an advanced wireless communication system. In certain embodiments, and one or more of the gNBs 101-103 includes circuitry, programing, or a combination thereof, for CSI acquisition in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
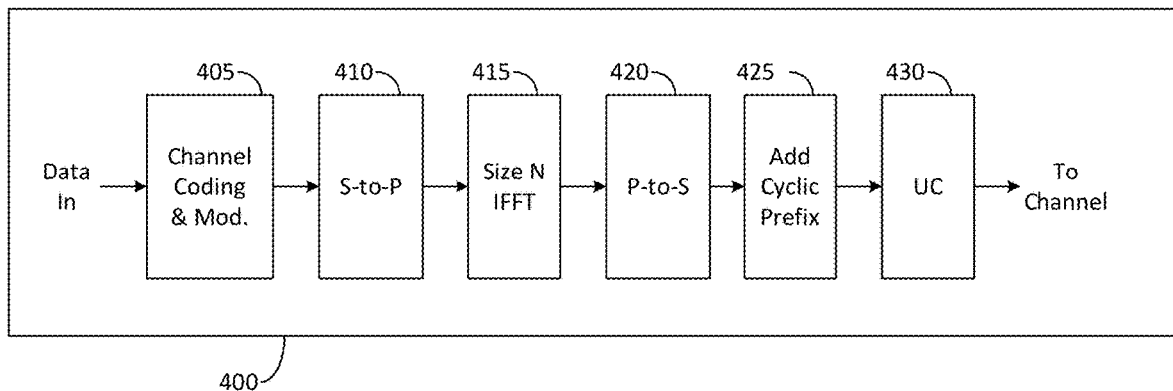
FIG. 4A illustrates a high-level diagram of an orthogonal frequency division multiple access transmit path according to embodiments of the present disclosure.
Figure 4B:
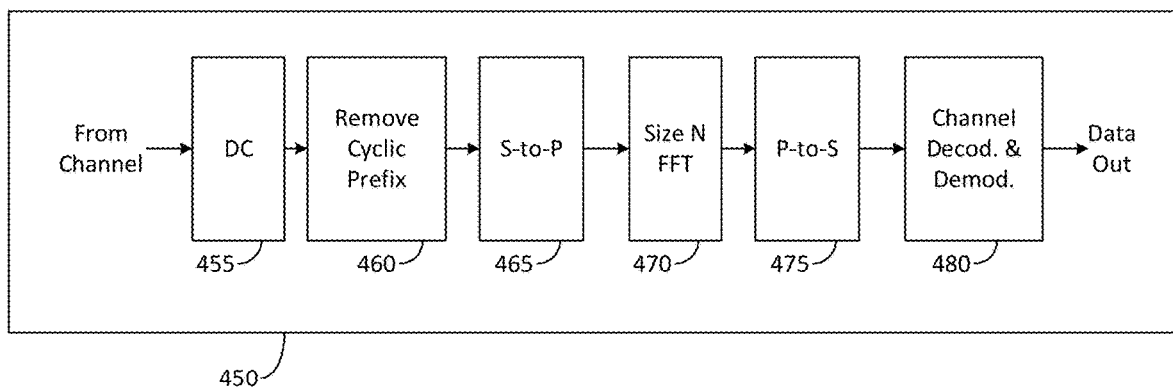
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116 Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
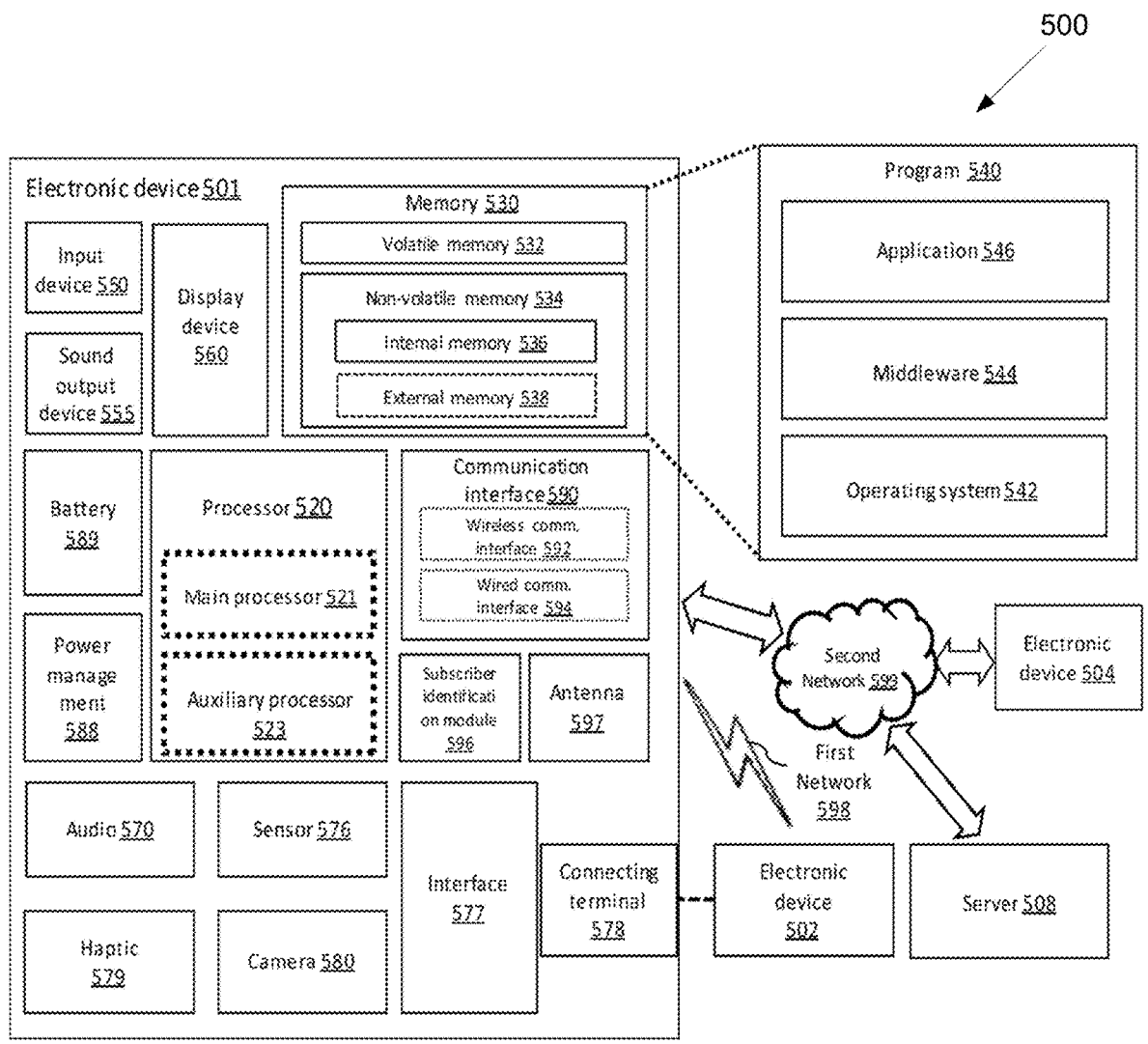
FIG. 5 illustrates an example electronic device according to embodiments of the present disclosure.

FIG. 5 illustrates an example electronic device 500 according to embodiments of the present disclosure. The embodiment of the electronic device 500 illustrated in FIG. 5 is for illustration only. FIG. 5 does not limit the scope of the present disclosure to any particular implementation.

PDs can be an electronic device. FIG. 5 illustrates an example electronic device 501 in a network environment 500 according to various embodiments. Referring to FIG. 5, the electronic device 501 in the network environment 500 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 101, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 101 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor(e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill all scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

There are two aspects neglected in IEEE standard specification, which are essential for future use cases. The first one is the optimized transmission procedure between one or more initiators and one or more responders, which can be critical for energy-saving purpose. Since a poll can be broadcast to multiple responders, an initiator can initialize a multicast, i.e., one-to-many, ranging round by sending a single poll instead of launching multiple unicast ranging rounds. Similarly, since the ranging response can also be broadcast to multiple initiators, a responder can embed the requested data respectively from different initiator in a single ranging response message. Exploiting the broadcast characteristics of wireless channel, the optimized transmission procedure is promising for future UWB network.

The other neglected aspect is the option for the contention-based ranging in an UWB network. In IEEE specification, one ranging round just contains a single pair of devices, i.e., one initiator and one responder. Within one ranging round, transmissions are implicitly scheduled: a responder/initiator expects to receive the message from the far end and may start to transmit afterwards. Multiple ranging rounds can be scheduled by the CFP table of the sync frame. However, there can be other use cases that cannot be supported by IEEE standard specification. For example, the initiator broadcasts the poll, but it does not have the prior knowledge of who may response. Similarly, the responder may not have the prior knowledge of who may initialize the ranging, so it can wait and listen for a certain period of time to collect polls respectively from different initiators.

In the present disclosure, an UWB network is provided with ranging requests between a group of devices and another group of devices. As shown in FIG. 6, one or more devices of group-1 has the ranging request to one or more devices of group-2 or vice versa. To accommodate optimized ranging transmission procedure and other new use cases, the configuration of device role, i.e., whether the configuration of device is an initiator or a responder, and the scheduling information for scheduling-based ranging, need to be determined and exchanged before the ranging round starts. Aiming to build a stand-alone UWB network, the present disclosure defines new control IE, and ranging scheduling IE for initiators and responders, which can be exchanged over the UWB MAC. However, the present disclosure does not preclude other methods to exchange information via the higher layer or out-of-band management.

Figure 7:
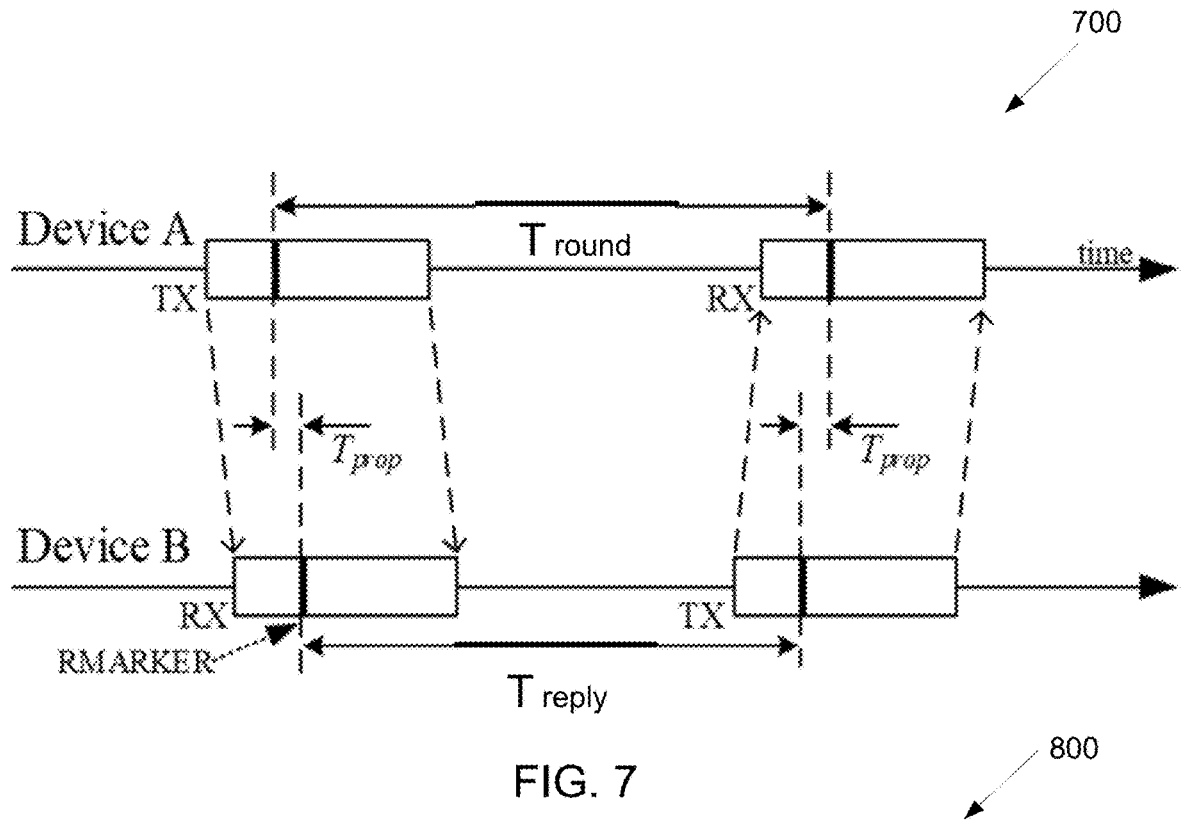
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation.

SS-TWR involves a simple measurement of the roundtrip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation: $\hat{T}_{prop} = \frac{1}{2}(T_{round} - T_{reply})$.

Figure 8:
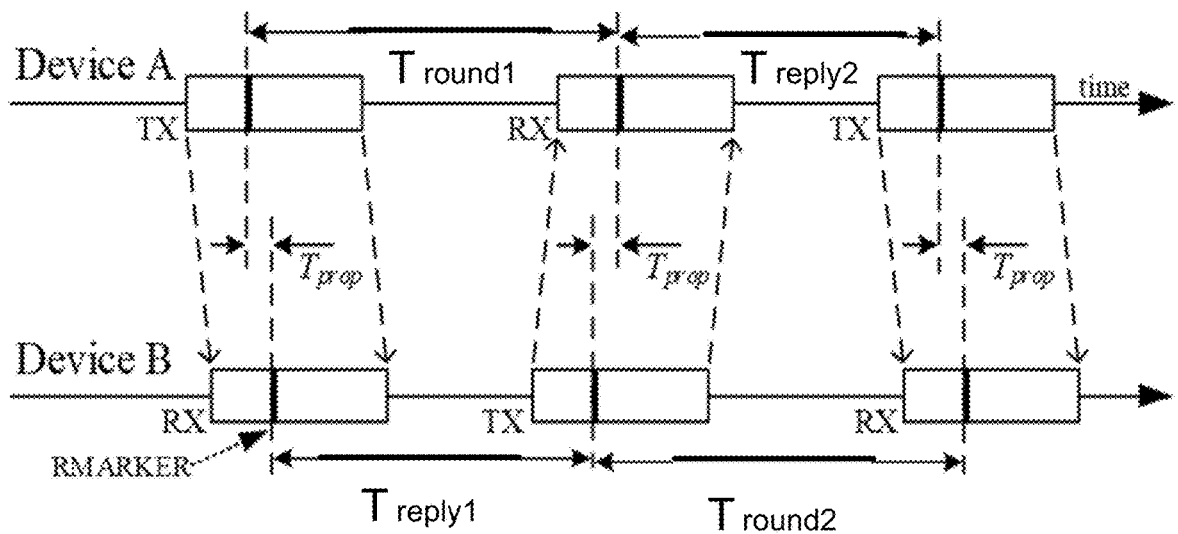
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation.

DS-TWR with three messages is illustrated in FIG. 8, which reduces the estimation error induced by clock drift from long response delays. Device A is the initiator to initialize the first roundtrip measurement, while device B as the responder, responses to complete the first roundtrip measurement, and meanwhile initialize the second roundtrip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

Figure 9:
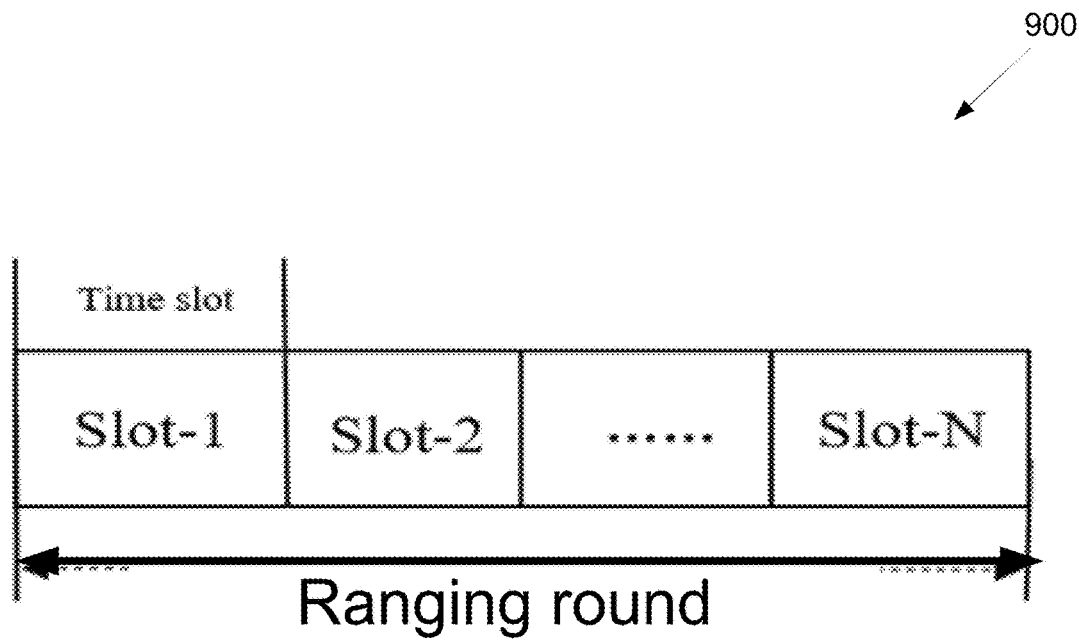
FIG. 9 illustrates an example time structure of ranging round according to embodiments of the present disclosure.

FIG. 9 illustrates an example time structure of ranging round 900 according to embodiments of the present disclosure. The embodiment of the time structure of ranging round 900 illustrated in FIG. 9 is for illustration only. FIG. 9 does not limit the scope of the present disclosure to any particular implementation.

A ranging configuration incorporates the control information of a ranging round, which consists of multiple time slots as shown in FIG. 9. Time slot is the basic time unit to fulfill a message exchange. Other conventions to fulfill the same functionalities as ranging round and time slot are not precluded in the present disclosure. Depending on the device capabilities, slot duration and number of time slots in a ranging round can be adjusted in the ranging configuration, or the, slot duration and number of time slots are fixed to the default setting. One or multiple pair of devices can participate in a ranging round to fulfill the ranging requests.

Figure 10:
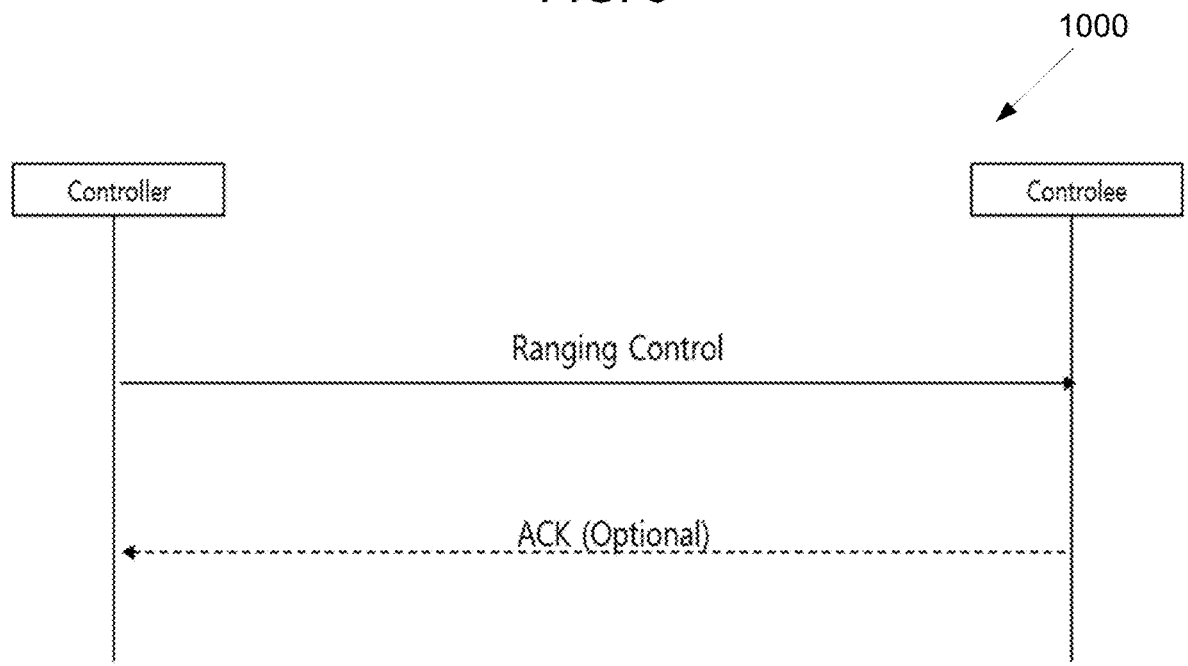
FIG. 10 illustrates an example ranging device nomenclatures with controller and controlee according to embodiments of the present disclosure.

FIG. 10 illustrates an example ranging device nomenclatures with controller and controlee 1000 according to embodiments of the present disclosure. The embodiment of the ranging device nomenclatures with controller and controlee 1000 illustrated in FIG. 10 is for illustration only. FIG. 10 does not limit the scope of the present disclosure to any particular implementation.

The setting of a ranging configuration determined by the next higher layer can be sent to one or more ranging controlees from a ranging controller (lead device) as shown in FIG. 10. With different network formations, the ranging configuration can be conveyed via a dedicated data frame sent to one or more devices, or, the ranging configuration can be embedded into a sync frame broadcast to all devices in the network. Meanwhile, the present disclosure does not preclude other methods to exchange the ranging configuration information, e.g., via the higher layer or our-of-band management.

Figure 11:
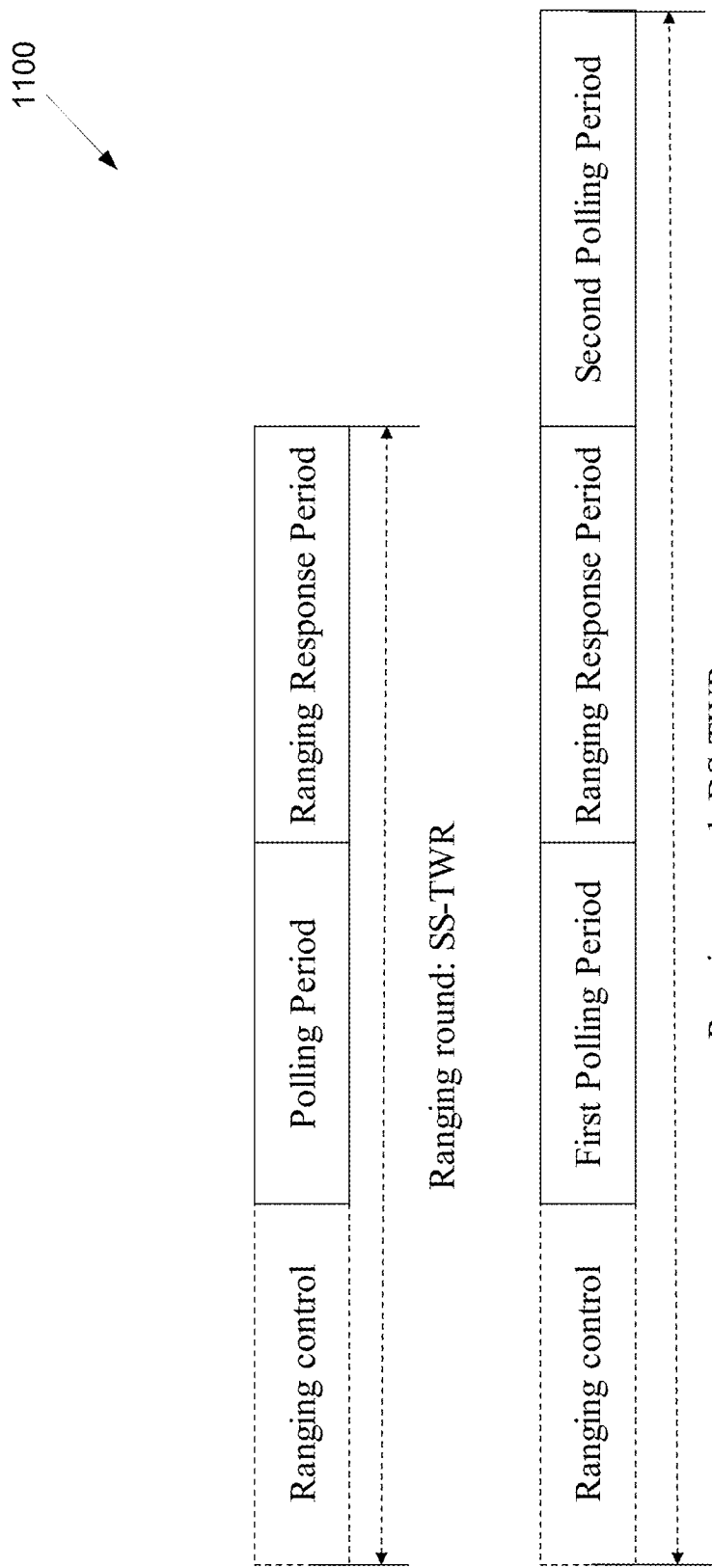
FIG. 11 illustrates an example general ranging round structure according to embodiments of the present disclosure.

FIG. 11 illustrates an example general ranging round structure 1100 according to embodiments of the present disclosure. The embodiment of the general ranging round structure 1100 illustrated in FIG. 11 is for illustration only. FIG. 11 does not limit the scope of the present disclosure to any particular implementation.

Ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s). FIG. 11 respectively illustrates two examples for the SS-TWR and DS-TWR with three message exchanges, other examples are not precluded. A ranging round can start with a ranging control period to exchange the ranging configuration over the UWB MAC. However, a ranging round can also start with a polling period if the ranging configuration is exchanged at the higher layer.

For the SS-TWR, one ranging round contains a PP and an RRP. For the DS-TWR with three messages, one ranging round contains a first PP, an RRP, and a second PP. Each period consists of one or more time slots, where transmissions from initiator(s)/responder(s) can be scheduled as determined by the next higher layer.

Figure 12:
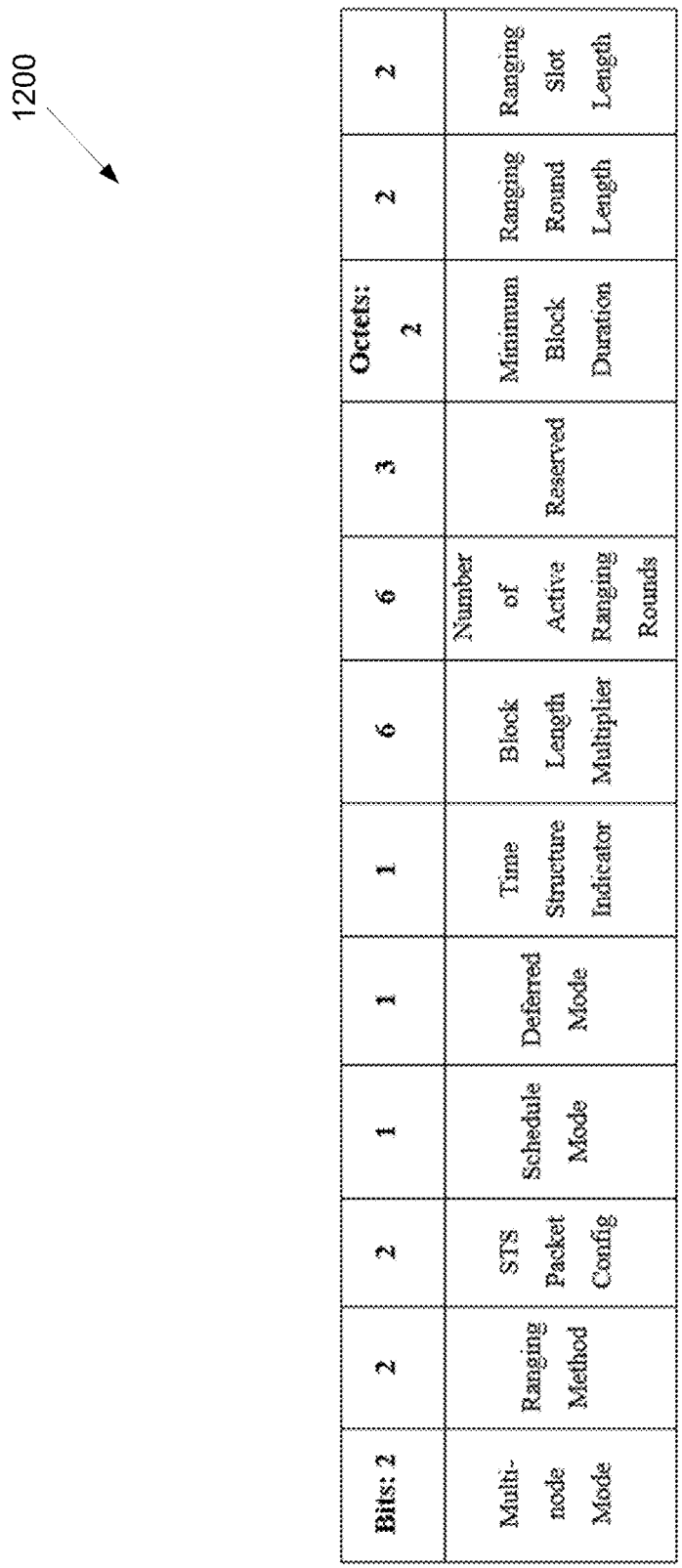
FIG. 12 illustrates an example advanced ranging control IE content field format according to embodiments of the present disclosure.

FIG. 12 illustrates an example advanced ranging control IE content field format 1200 according to embodiments of the present disclosure. The embodiment of the advanced ranging control IE content field format 1200 illustrated in FIG. 12 is for illustration only. FIG. 12 does not limit the scope of the present disclosure to any particular implementation.

The Advanced ranging control IE (ARC IE) is used by a controller to send the ranging configuration information to a controlee (in a unicast frame) or multiple controlees (in a broadcast frame) as illustrated in FIG. 10. The content field of the ARC IE is formatted as shown in FIG. 12. Detailed descriptions of fields can be referred to the current spec of IEEE 802.15.4z.

In the development of IEEE 802.15.4z, the main enhancement for secure ranging is the inclusion a scrambled timestamp sequence (STS) in the basic PHY protocol data unit (PPDU) format. Since the unique STS of a device is known by one or more far ends in a trusted group, the secure ranging can be performed within the trusted group, and the chance of being attacked is significantly reduced. In the present disclosure, the framework is built upon the fact that STSs of devices have been exchanged successfully, which can be done via, e.g., higher layer control or out-of-band management. How to initialize/update STS, and exchange STS between devices is out of the scope of the present disclosure.

Figure 13:
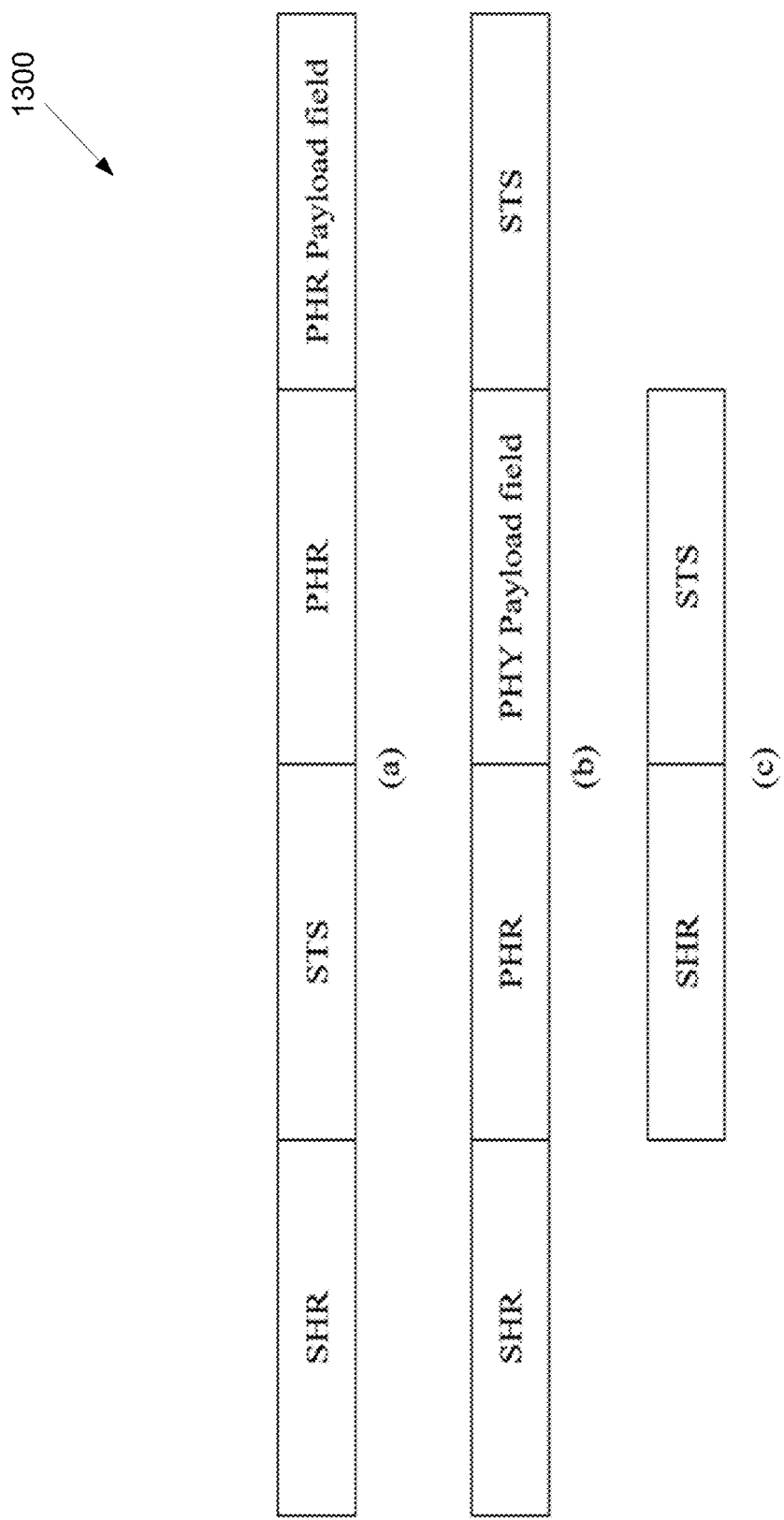
FIG. 13 illustrates an example secure ranging PPDU formats according to embodiments of the present disclosure.

FIG. 13 illustrates an example secure ranging PPDU formats 1300 according to embodiments of the present disclosure. The embodiment of the secure ranging PPDU formats 1300 illustrated in FIG. 13 is for illustration only. FIG. 13 does not limit the scope of the present disclosure to any particular implementation.

Three secure ranging PPDU formats may be supported, the difference between the formats being the location of the STS and existence of a PHR and PHY payload field as shown in FIG. 13. Abbreviations in FIG. 13 represent the following definitions, respectively: SHR (synchronization header); STS (scrambled timestamp sequence); and PHR (PHY header).

The locations of STS are different in FIG. 13 (e.g., (a) and (b)). For the format of FIG. 13 (e.g., (c)), there is no PHY header or data field (NHD). It may be called as the ranging based on PPDU format of FIG. 13 (e.g., (c)) as NHD secure ranging. Other conventions which fulfill similar concepts are not precluded in the present disclosure.

In one embodiment 1 (E1), controls of initiators/responders are provided in an UWB network.

The control information of initiators and responders, including the scheduling assignment, and role of devices, can be conveyed in the ranging control frame/message broadcast from a controller to multiple controlees. However, the present disclosure does not preclude other methods to exchange this information, e.g., via the higher layer or out-of-band management.

Figure 14:
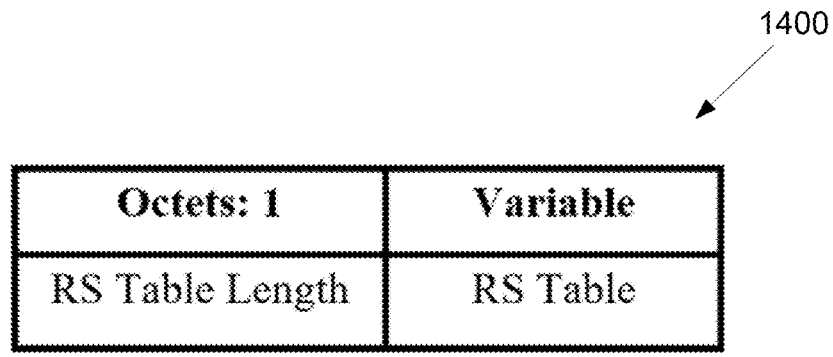
FIG. 14 illustrates an example content fields of ranging scheduling (RS) IE according to embodiments of the present disclosure.

FIG. 14 illustrates an example content fields of ranging scheduling (RS) IE 1400 according to embodiments of the present disclosure. The embodiment of the content fields of ranging scheduling (RS) IE 1400 illustrated in FIG. 14 is for illustration only. FIG. 14 does not limit the scope of the present disclosure to any particular implementation.

Figure 15:
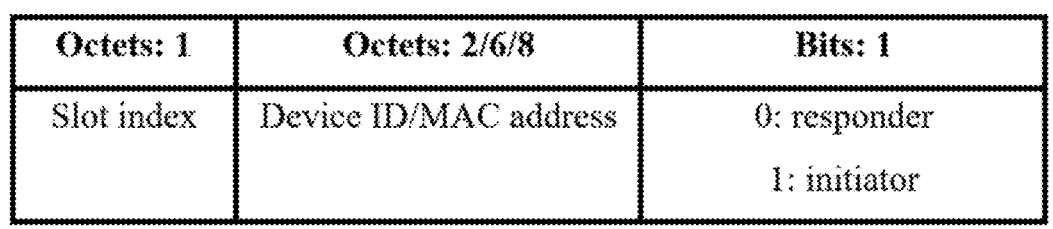
FIG. 15 illustrates an example row of RS table according to embodiments of the present disclosure.

FIG. 15 illustrates an example row of RS table 1500 according to embodiments of the present disclosure. The embodiment of the row of RS table 1500 illustrated in FIG. 15 is for illustration only. FIG. 15 does not limit the scope of the present disclosure to any particular implementation.

In one example of scheme 1 (S1), scheduling-based ranging is provided.

For the scheduling-based ranging, the ranging scheduling (RS) IE can be used to convey the resource assignment. FIG. 14 and FIG. 15 illustrate an example of the content fields of the RS IE, while the general format of IE can be referred to IEEE specification.

The RS IE contains an RS table, where each row consists of a time slot index, the address of device assigned to this slot, and the flag to indicate the role/type of the assigned device. For the address field, the present disclosure does not restrict the address field size to be 2, 6, or 8 octets. Other shorter addresses can also be used, depending on the network configuration. The field of RS table length indicate the number of rows in the RS table, which is equivalent to the number of available time slots/resource elements in a ranging round. After successfully exchange this IE in the UWB network, controller and controlees know their respective roles/types, and scheduling assignment in this ranging round. Then, devices can behave accordingly once the ranging round starts.

Figure 16:
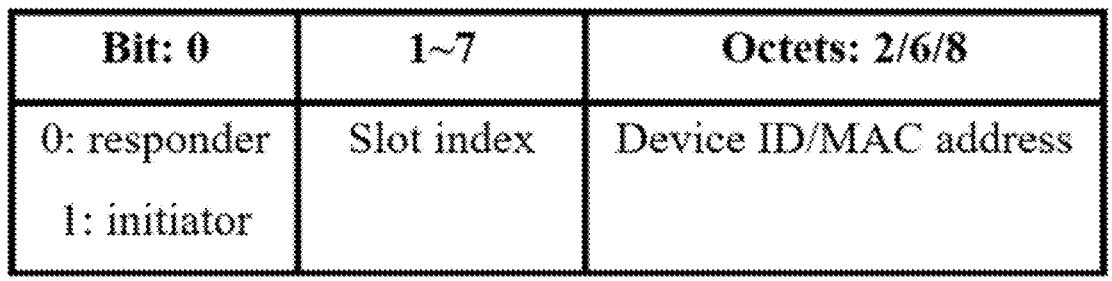
FIG. 16 illustrates another example row of RS table according to embodiments of the present disclosure.

FIG. 16 illustrates another example row of RS table 1600 according to embodiments of the present disclosure. The embodiment of the row of RS table 1600 illustrated in FIG. 16 is for illustration only. FIG. 16 does not limit the scope of the present disclosure to any particular implementation.

The fields of device type and slot index in FIG. 15 can be combined into a single field of one octet as FIG. 16.

Due to various PPDU formats to support ranging or data transmissions as shown in FIG. 13, RS IE can also be used to control the PPDU format used by an RFRAME/data frame transmitted in a scheduled time slot. Additional field can be introduced to specify the STS mode as illustrated in FIG. 17.

Figure 17:
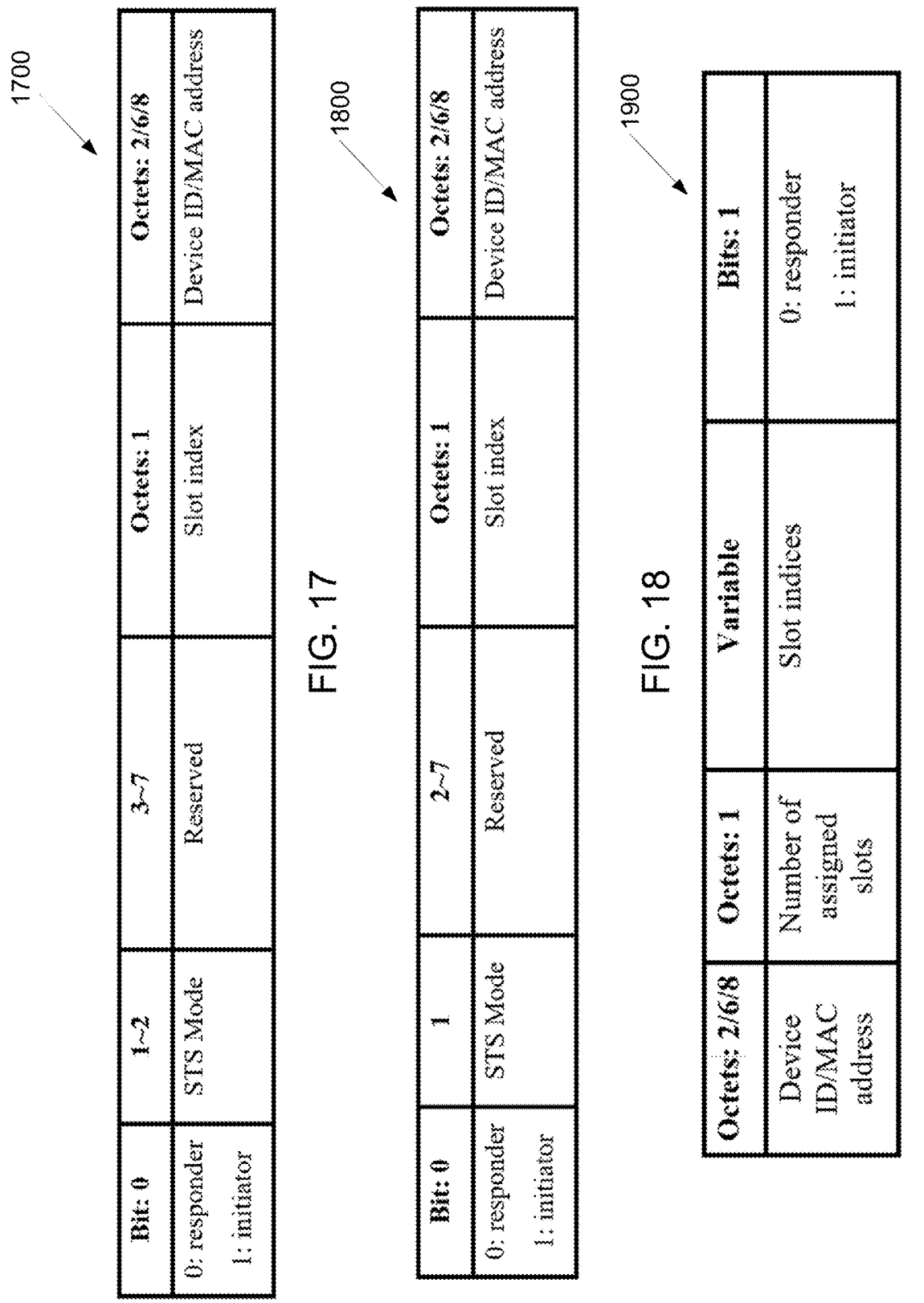
FIG. 17 illustrates an example row of RS table with STS mode field according to embodiments of the present disclosure.

FIG. 17 illustrates an example row of RS table with STS mode field 1700 according to embodiments of the present disclosure. The embodiment of the row of RS table with STS mode field 1700 illustrated in FIG. 17 is for illustration only. FIG. 17 does not limit the scope of the present disclosure to any particular implementation.

The first bit of the first octet in FIG. 17 is to indicate the type of a device, which is scheduled on the slot. Next two bits can be used to indicate the type of PPDU format. An example setting of STS mode field can be: "00" indicates PPDU format without STS, namely STS mode 0 (SM0); "01" denotes PPDU format of FIG. 13 (e.g., (a)), namely STS mode 1 (SM1); "10" denotes PPDU format of FIG. 9(b), namely STS mode 2 (SM2); "11" indicates PPDU format of FIGURE (e.g., (c)), namely STS mode 3 (SM3).

Depending on the device capability and specific applications, ranging devices may be capable of supporting PPDU formats of SM0 and SM1 (or SM2). Then, one-bit field can be used for STS mode, which reduces a row of CP table in FIG. 17 to the one in FIG. 18.

Figure 18:
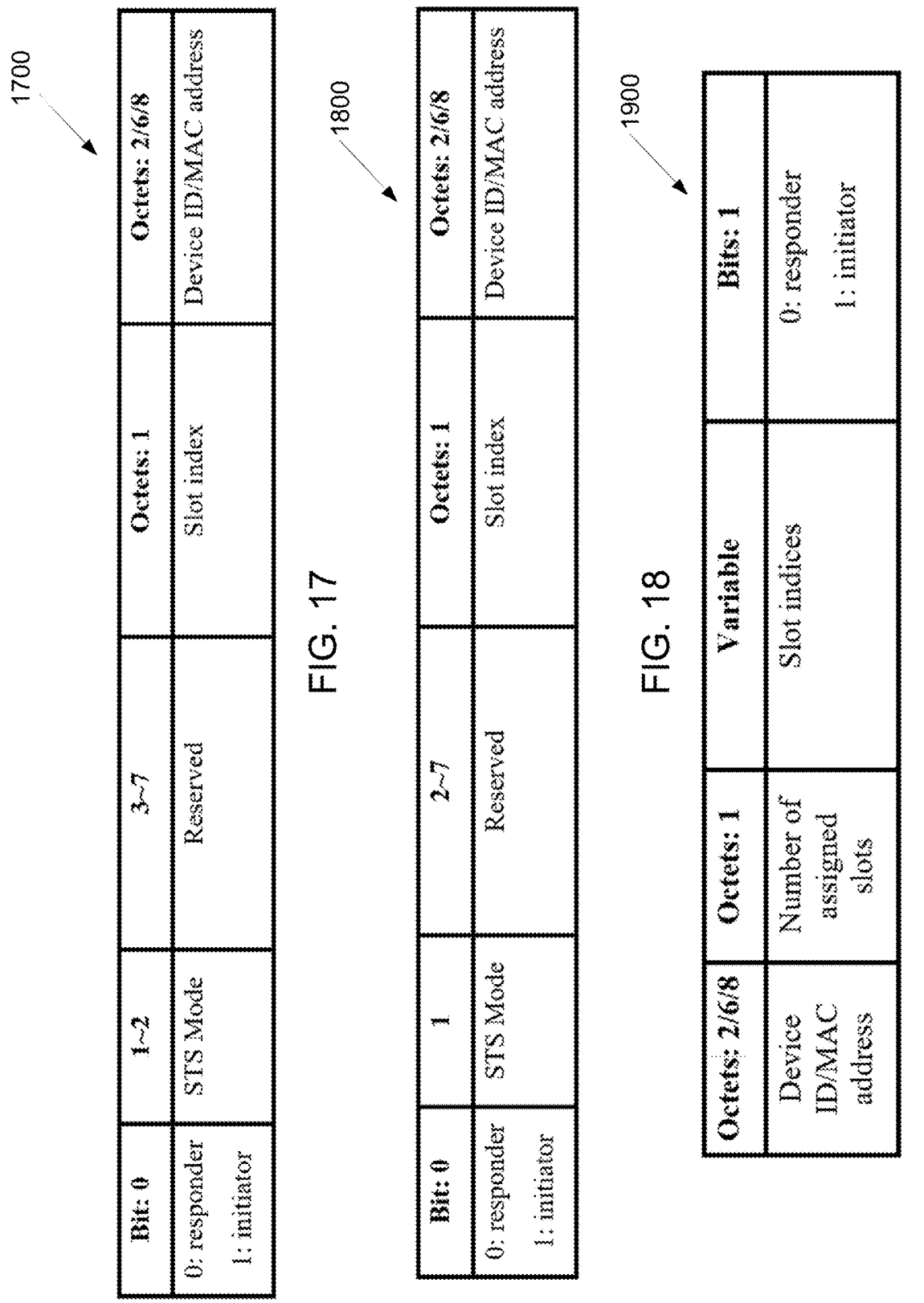
FIG. 18 illustrates an example row of RS table with STS mode field according to embodiments of the present disclosure.

FIG. 18 illustrates an example row of RS table with STS mode field 1800 according to embodiments of the present disclosure. The embodiment of the row of RS table with STS mode field 1800 illustrated in FIG. 18 is for illustration only. FIG. 18 does not limit the scope of the present disclosure to any particular implementation.

Figure 19:
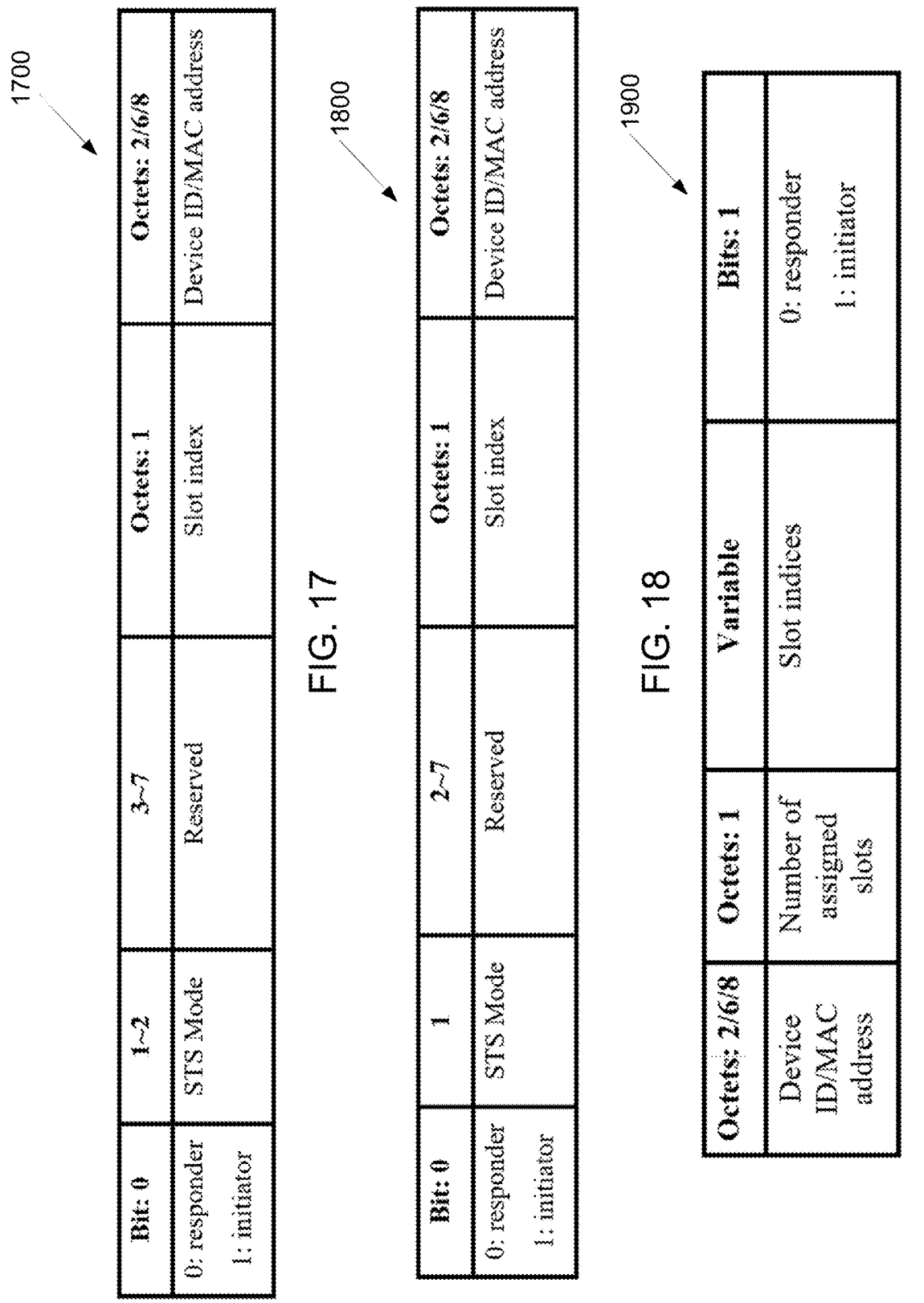
FIG. 19 illustrates an example row of RS table according to embodiments of the present disclosure.

The present disclosure does not preclude other variations of IE structures or payload fields to fulfill the same function. For example, as shown in FIG. 19, each row of RS table can also be used to represent a device, including the address field, assigned time-slot indices, and role indicator. Therefore, the number of rows in the RS table becomes the number of devices in an UWB network.

FIG. 19 illustrates an example row of RS table 1900 according to embodiments of the present disclosure. The embodiment of the row of RS table 1900 illustrated in FIG. 19 is for illustration only. FIG. 19 does not limit the scope of the present disclosure to any particular implementation.

As illustrated in FIG. 19, the first field indicates the address of ranging device, which can be a 2, 6, or 8-octet address. The second and third field denote the number of slots, and slot indices, respectively. Each slot index can occupy one octet. However, the present disclosure does not preclude other options to allocate bits. Similar to FIG. 15, the last bit field indicates the device type.

Figure 20:
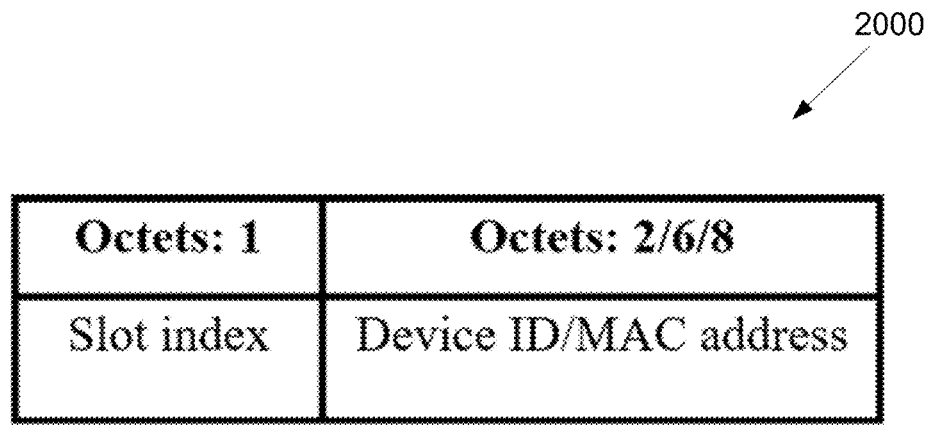
FIG. 20 illustrates an example row of RS table without device type field according to embodiments of the present disclosure.

FIG. 20 illustrates an example row of RS table without device type field 2000 according to embodiments of the present disclosure. The embodiment of the row of RS table without device type field 2000 illustrated in FIG. 20 is for illustration only. FIG. 20 does not limit the scope of the present disclosure to any particular implementation.

Figure 21:
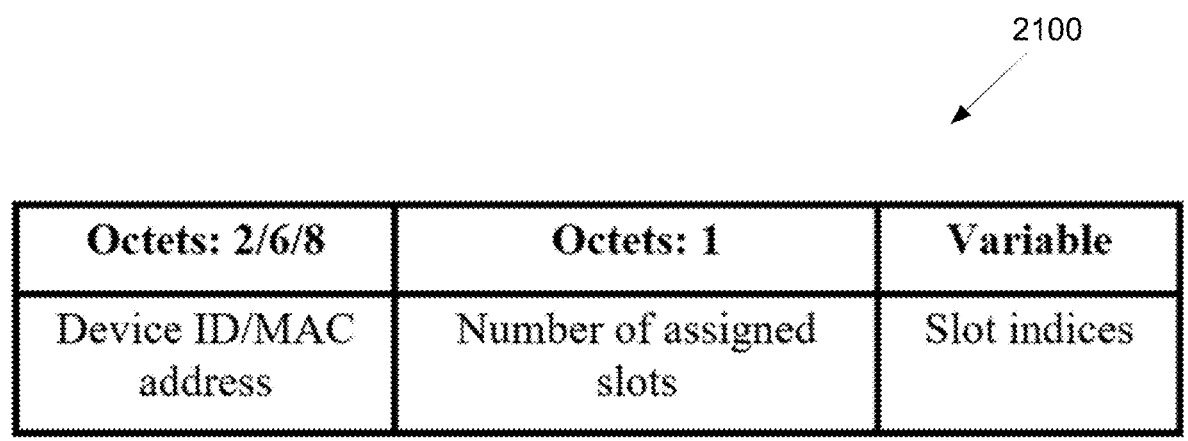
FIG. 21 illustrates another example row of RS table without device type field according to embodiments of the present disclosure.

FIG. 21 illustrates another example row of RS table without device type field 2100 according to embodiments of the present disclosure. The embodiment of the row of RS table without device type field 2100 illustrated in FIG. 21 is for illustration only. FIG. 21 does not limit the scope of the present disclosure to any particular implementation.

Depending on different use cases, other variations of content fields can also be used to save more bits. For example, with the scenario of one initiator-to-many responders, the initiator may be a controller, and there is no need to use the flag-bit to indicate role in the RS table, since all controlees are the responders. Consequently, a row of RS table, i.e., FIG. 15 and FIG. 19, can be reduced to FIG. 20 and FIG. 21.

Figures 22, 23:
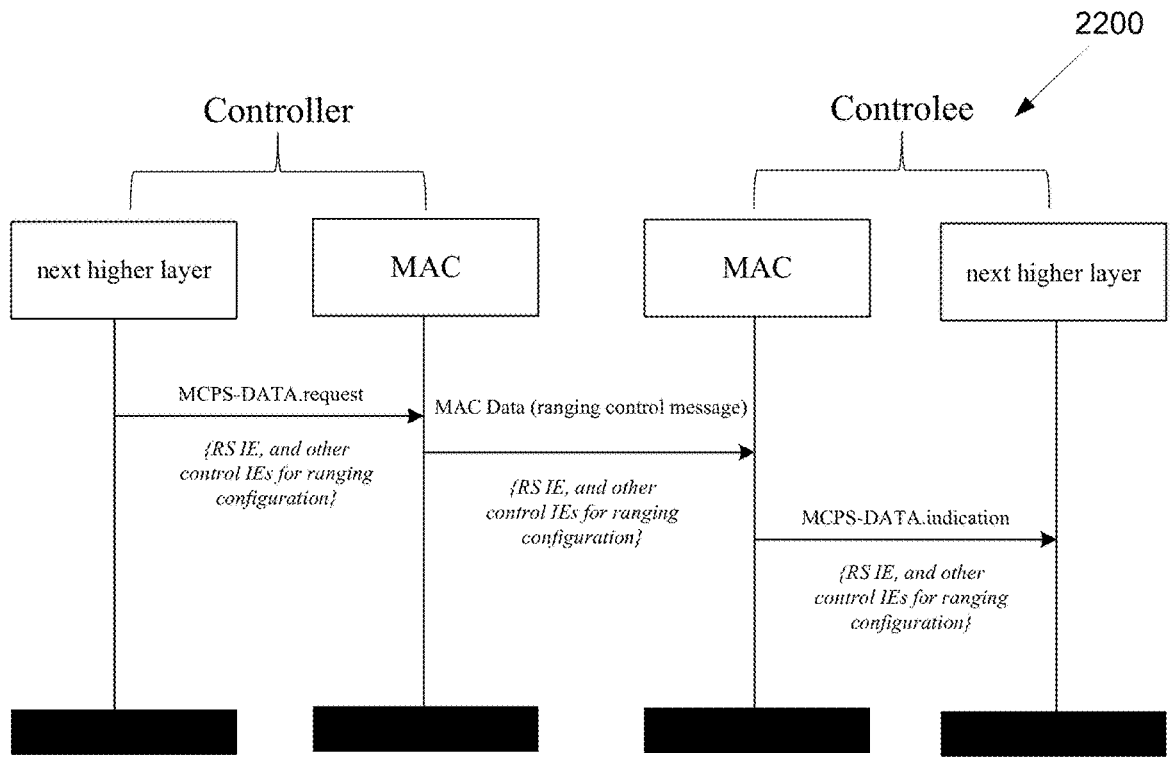
FIG. 22 illustrates an example message sequence chart of exchanging ranging scheduling information via RS IE according to embodiments of the present disclosure.
FIG. 23 illustrates an example revised row of RS table according to embodiments of the present disclosure.

FIG. 22 illustrates an example message sequence chart of exchanging ranging scheduling information via RS IE 2200 according to embodiments of the present disclosure. The embodiment of the message sequence chart of exchanging ranging scheduling information via RS IE 2200 illustrated in FIG. 22 is for illustration only. FIG. 22 does not limit the scope of the present disclosure to any particular implementation.

An example of message sequence chart to exchange the scheduling information is illustrated in FIG. 22. The RS IE is conveyed in the ranging control message with other control IEs for ranging configuration. There can be one or more ranging controlees. FIG. 22 illustrates a message sequence chart of exchanging ranging scheduling information via RS IE.

Instead of directly fulfilling scheduling of time slots in a ranging round via RS IE in the ranging control message (e.g., as shown in FIG. 22), there can be use cases where the ranging controller may reserve some time slot(s) via RS IE in the ranging control message, and exchange scheduling information of these slots later during a ranging round. To accommodate this requirement, another field to indicate the presence of address and device type is added, and the revised row of RS table becomes.

FIG. 23 illustrates an example revised row of RS table 2300 according to embodiments of the present disclosure. The embodiment of the revised row of RS table 2300 illustrated in FIG. 23 is for illustration only. FIG. 23 does not limit the scope of the present disclosure to any particular implementation.

As illustrated in FIG. 23, additional one-bit field is introduced to indicate the presence of following address and device type. If the value of one-bit field is zero, the row of RS table does not contain the field of address and device type, which indicates that the corresponding slot is reserved, but not scheduled yet. If this presence indicator is one, the following two fields exist, and the slot is scheduled to the assigned responder/initiator. Note that different types of address are not precluded in the present disclosure, which can be determined by DstAddrMode of MCPS-DATA.request. Meanwhile, other content field structures with different combinations of bits, which realize similar function as the one in FIG. 19, are not precluded in the present disclosure.

Figure 24:
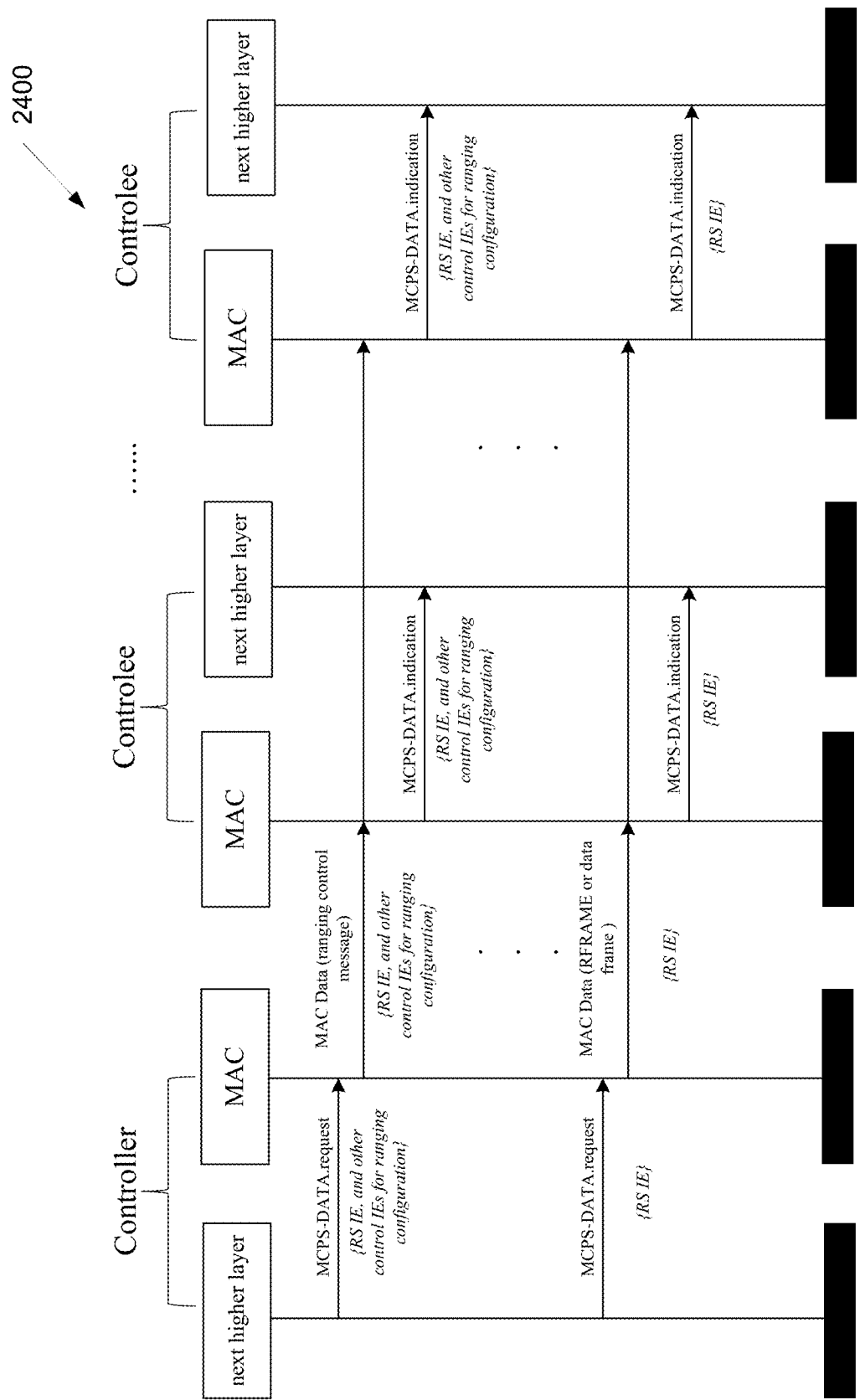
FIG. 24 illustrates an example message sequence chart of exchanging ranging scheduling information via RS IE according to embodiments of the present disclosure.

FIG. 24 illustrates an example message sequence chart of exchanging ranging scheduling information via RS IE 2400 according to embodiments of the present disclosure. The embodiment of the message sequence chart of exchanging ranging scheduling information via RS IE 2400 illustrated in FIG. 24 is for illustration only. FIG. 24 does not limit the scope of the present disclosure to any particular implementation.

As illustrated in FIG. 24, an example of message sequence chart is exhibited for the RS IE with structure in FIG. 23. In a ranging round, the RS IE in the ranging control message can be used to schedule ranging transmissions and reserve some time slots for data report. After ranging period, controller can send the RS IE again via a reserved time slot to schedule remaining reserved time slots.

FIG. 24 illustrates a message sequence chart of exchanging ranging scheduling information via RS IE with structure in FIG. 23. In one example, the first RS IE is conveyed by ranging control message to schedule ranging transmissions and reserve some unscheduled time slots. In another example, the second RS IE can be inserted in an RFRAME if controlees can decode this message, otherwise it may be inserted in one of reserved time slots to schedule remaining ones.

Note that the present disclosure does not preclude the option to include RS IE in an RFRAME. For example, for the multicast DS-TWR ranging scenario where the ranging controller is also the ranging initiator, the first RS IE can be inserted into the ranging control message (RCM), or poll/ranging initiation message if RCM does not exist, to schedule ranging transmissions, while a second RS IE can be inserted into the second poll message to schedule the data reports.

In one example of scheme 2 (S2), contention-based ranging is provided.

For the contention-based ranging, the ranging configuration can set the contending window to be the entire ranging round for all initiator and responders. On the other hand, the ranging configuration can also divide a ranging round into multiple contention periods, while each period can be dedicated for either polls from initiators or ranging responses from responders to contend as FIG. 21. The present disclosure does not restrict to any one of methods to define contending window/periods. The exchange of the contention-based ranging configuration can also be conveyed by the ranging control frame/message as FIG. 20 or via the higher layer.

Figure 25:
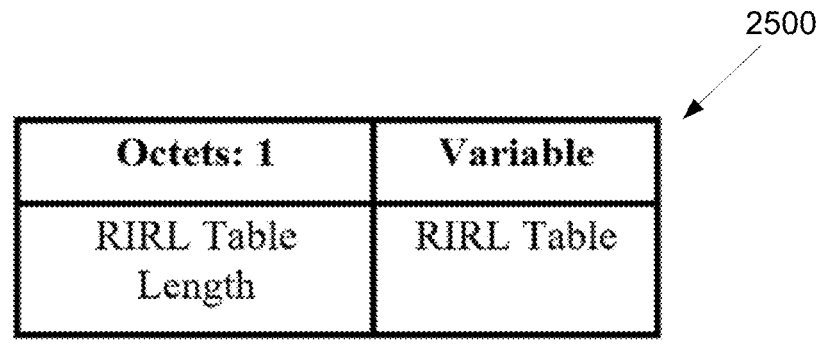
FIG. 25 illustrates an example content fields of ranging initiator/responder list (RIRL) IE according to embodiments of the present disclosure.
Figure 26:
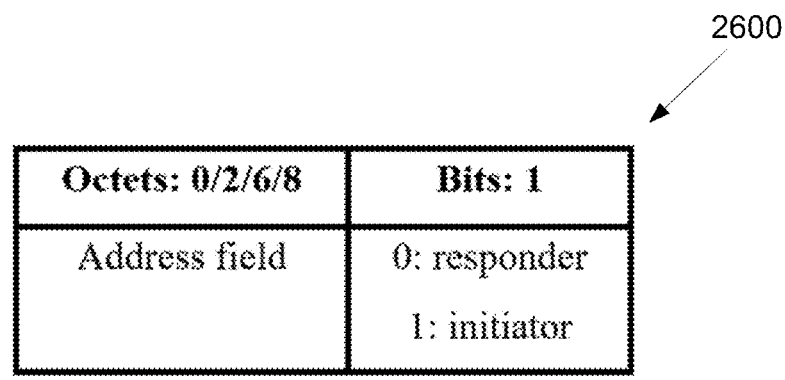
FIG. 26 illustrates an example row of RIRL table according to embodiments of the present disclosure.

Since there is no RS IE for the contention-based ranging, the present disclosure defines a separate IE, namely ranging initiator/responder list (RIRL) IE, to inform roles of devices. FIG. 25 and FIG. 26 illustrate an example of the IE content fields, while the general format of IE can be referred to IEEE specification.

FIG. 25 illustrates an example content fields of ranging initiator/responder list (RIRL) IE 2500 according to embodiments of the present disclosure. The embodiment of the content fields of ranging initiator/responder list (RIRL) IE 2500 illustrated in FIG. 25 is for illustration only. FIG. 25 does not limit the scope of the present disclosure to any particular implementation.

FIG. 26 illustrates an example row of RIRL table 2600 according to embodiments of the present disclosure. The embodiment of the row of RIRL table 2600 illustrated in FIG. 26 is for illustration only. FIG. 26 does not limit the scope of the present disclosure to any particular implementation.

Figure 27:
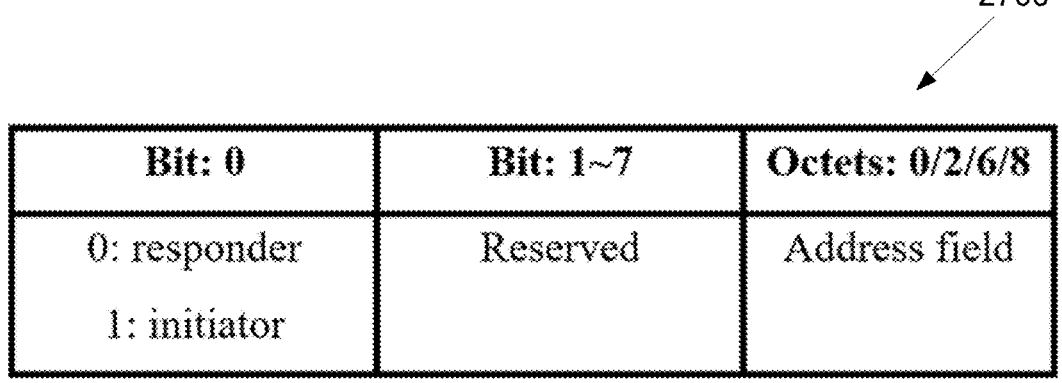
FIG. 27 illustrates another example row of RIRL table according to embodiments of the present disclosure.

FIG. 27 illustrates another example row of RIRL table 2700 according to embodiments of the present disclosure. The embodiment of the row of RIRL table 2700 illustrated in FIG. 27 is for illustration only. FIG. 27 does not limit the scope of the present disclosure to any particular implementation.

The RIRL IE contains an RIRL table, where each row includes an address field of a device, and a bit-flag to indicate the role of the device. For the address field, the present disclosure does not restrict the address field size to be 2, 6, or 8 octets. Other shorter addresses can also be used, depending on the network configuration. Note that different types of address can be determined by DstAddrMode of MCPS-DATA.request. Other structures of content fields to fulfill similar function are not precluded. For example, device type indicator can be the first bit of an octet in a row of RIRL table as shown in FIG. 27.

FIG. 28 illustrates yet another example row of RIRL table 2800 according to embodiments of the present disclosure. The embodiment of the row of RIRL table 2800 illustrated in FIG. 28 is for illustration only. FIG. 28 does not limit the scope of the present disclosure to any particular implementation.

For the unicast ranging between one ranging initiator and one ranging responder, controller can inform controlee device type without using the address field in FIG. 26 (or FIG. 27). To support both multicast/unicast ranging and include the option of saving address field in FIG. 26 (or FIG. 27) for unicast ranging, FIG. 28 illustrates another example of a row in RIRL table with additional bit field indicating the presence of address field.

In FIG. 28, both device type indicator and address presence indicator are included in the first octet of a row of RIRL table, while other bits of the first octet are reserved. Note that the present disclosure does not preclude other structure of content fields to fulfill similar function as FIG. 28 illustrates. For example, the address presence indicator can be added to the beginning of the RIRL IE, and FIG. 25 can be provided.

Since field of address present is included in the first octet of RIRL IE, each row of RIRL table can be maintained as FIG. 26 or FIG. 27.

The field of RIRL table length indicates the number of rows in the RIRL table, which is equivalent to the number of devices in the network. The exchange of the RIRL IE can also be fulfilled via the ranging control frame/message as shown in FIG. 10. But the present disclosure does not preclude other methods, e.g., via the higher layer or out-of-band management. All devices participating in a ranging round can be listed in the RIRL table, but it may not be necessary to convey full information of device roles.

FIG. 29 illustrates an example content fields of ranging initiator/responder list (RIRL) IE 2900 according to embodiments of the present disclosure. The embodiment of the content fields of ranging initiator/responder list (RIRL) IE 2900 illustrated in FIG. 29 is for illustration only. FIG. 29 does not limit the scope of the present disclosure to any particular implementation.

Alternatively, as shown in FIG. 30 and FIG. 31, the controller can list the addresses of all initiators or responders in the RIRL table and set the role indicator to be 1 or 0 for all listed devices, which may save bits for control information exchange. For those devices which do not detect their addresses respectively in the RIRL table, those devices know their roles may be opposite to the one configured in the RIRL IE.

Above two structures of IE content fields are general examples. But there can also be other variations with more simplified structures. For example, the controller may form an initiator list (IL) IE or responder list (RL) IE with an address list of initiators or responders. Therefore, there is no need to have additional bit to indicate whether the device is an initiator or a responder. For devices which do not find their addresses in the list of initiators or responders, the devices know their roles may be opposite. If the UWB network can only support one initiator in a ranging round, the controller can simply broadcast the address filed of the initiator. In this special case, there is no need to use the field of role indicator and table length as shown in FIG. 26, FIG. 25, and FIG. 30.

FIG. 30 illustrates another example content fields of ranging initiator/responder list (RIRL) IE 3000 according to embodiments of the present disclosure. The embodiment of the content fields of ranging initiator/responder list (RIRL) IE 3000 illustrated in FIG. 30 is for illustration only. FIG. 30 does not limit the scope of the present disclosure to any particular implementation.

FIG. 31 illustrates an example row of RIRL table 3100 according to embodiments of the present disclosure. The embodiment of the row of RIRL table 3100 illustrated in FIG. 31 is for illustration only. FIG. 31 does not limit the scope of the present disclosure to any particular implementation.

In one example of scheme 3 (S3), the control of scheduling-based and/or contention-based ranging is included in the advanced ranging control (ARC) IE.

The content fields of RS IE and/or RIRL can also be included in the advanced ranging control (ARC) IE as illustrated in FIG. 12 to control scheduling-based and/or contention-based ranging.

Figure 32:
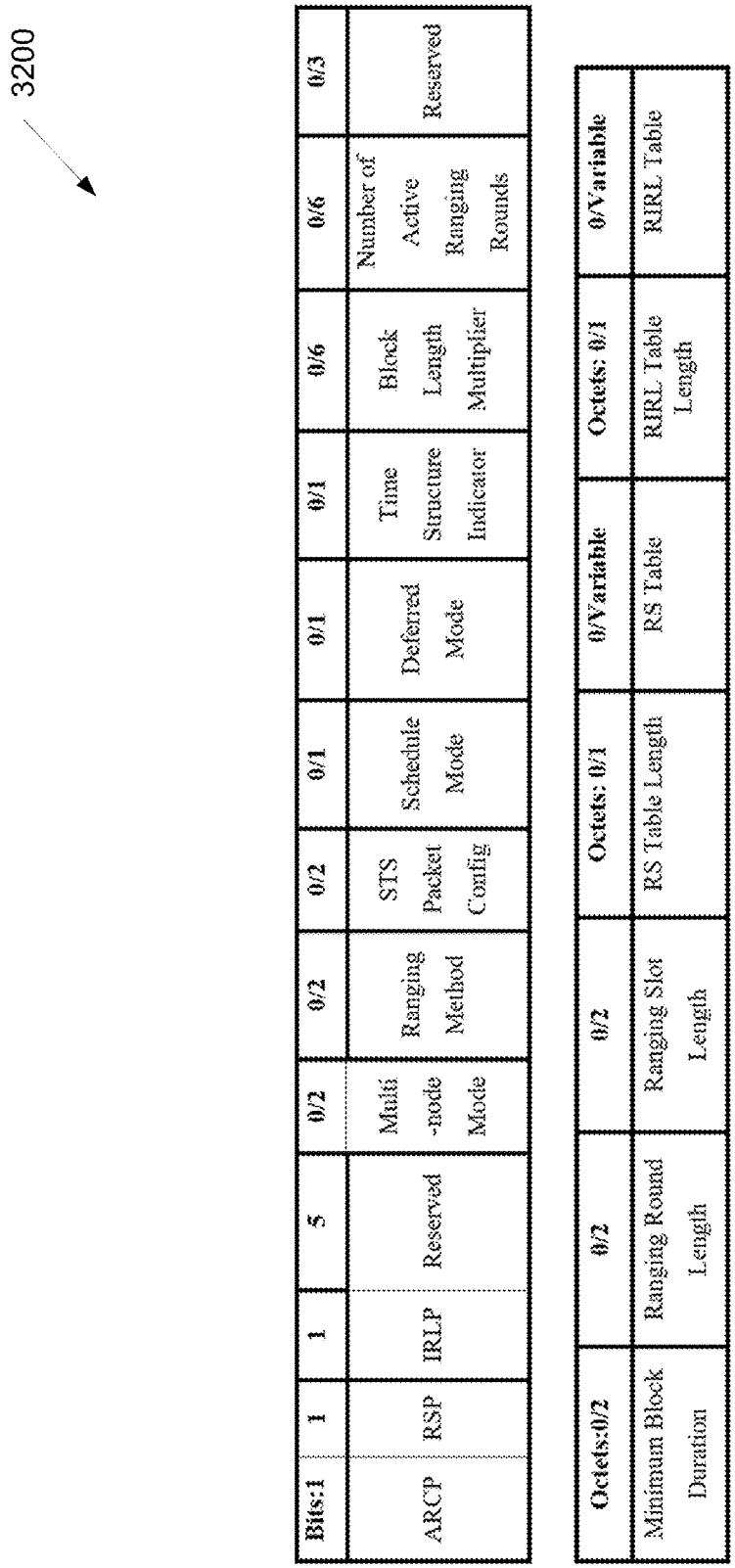
FIG. 32 illustrates an example content field format of ARC IE with ranging scheduling control and initiator/responder list according to embodiments of the present disclosure.

FIG. 32 illustrates an example content field format of ARC IE with ranging scheduling control and initiator/responder list 3200 according to embodiments of the present disclosure. The embodiment of the content field format of ARC IE with ranging scheduling control and initiator/responder list 3200 illustrated in FIG. 32 is for illustration only. FIG. 32 does not limit the scope of the present disclosure to any particular implementation.

FIG. 32 illustrates an example of revised ARC IE content field format, which includes the control of ranging scheduling and initiator/responder list. One octet can be introduced at the beginning of ARC IE content field to act as the control field for the presence of following fields. First three bits of this octet are used as presence indicators to denote the existence of fields for fulfilling ranging configuration, ranging scheduling, and ranging initiator responder list, respectively, while remaining five bits can be reserved. The present disclosure does not constrain the terms of these fields, and other structures of bit fields to realize the same function are not precluded.

If advanced ranging control present (ARCP) is 1, fields for ranging configuration are present, including multi-node mode, ranging method, STS packet config, schedule mode, deferred mode, Time Structure Indicator, block length multiplier, Number of Active ranging rounds, 3-bit reserved field, Minimum block duration, ranging round length, ranging slot length. Otherwise, these fields do not exist. In the development of IEEE 802.15.4z, changes of content field format in the ARC IE for ranging configuration are not precluded by the present disclosure. Whether these fields are present or not can be indicated by the ARCP.

If ranging scheduling present (RSP) is 1, fields of RS table length and RS table are present to fulfill the ranging scheduling. These fields can be used alone if ranging configuration has already been exchanged before. Fields of RS table length and RS table can also be along with the fields for ranging configuration when value of ARCP is 1, and value of schedule mode is 1. If value of RSP is 0, fields of RS table length and RS table are not present. Examples of RS table row/element can be found in the Scheme 1 illustrated in FIGS. 15 to 21, and FIG. 23. Depending on implementations and use cases, one example can be selected and used, while other structures to fulfill similar function are not precluded by the present disclosure.

If initiator/responder list present (IRLP) is 1, fields of RIRL table length and RIRL table are present to list the types of devices for contention-based ranging with known device identities. These fields can be used alone before the ranging exchange starts to specify device type of controlee(s) by a controller. Fields of RIRL table length and RIRL table can also be along with the fields for ranging configuration when value of ARCP is 1, and value of schedule mode is 0. If value of IRLP is 0, fields of RIRL table length and RIRL table are not present. Examples of RIRL table and the row/element can be found in the Scheme 2 illustrated by FIGS. 25 to 31. Depending on implementations and use cases, one example can be selected and used, while other structures to fulfill similar function are not precluded by the present disclosure.

Figure 33:
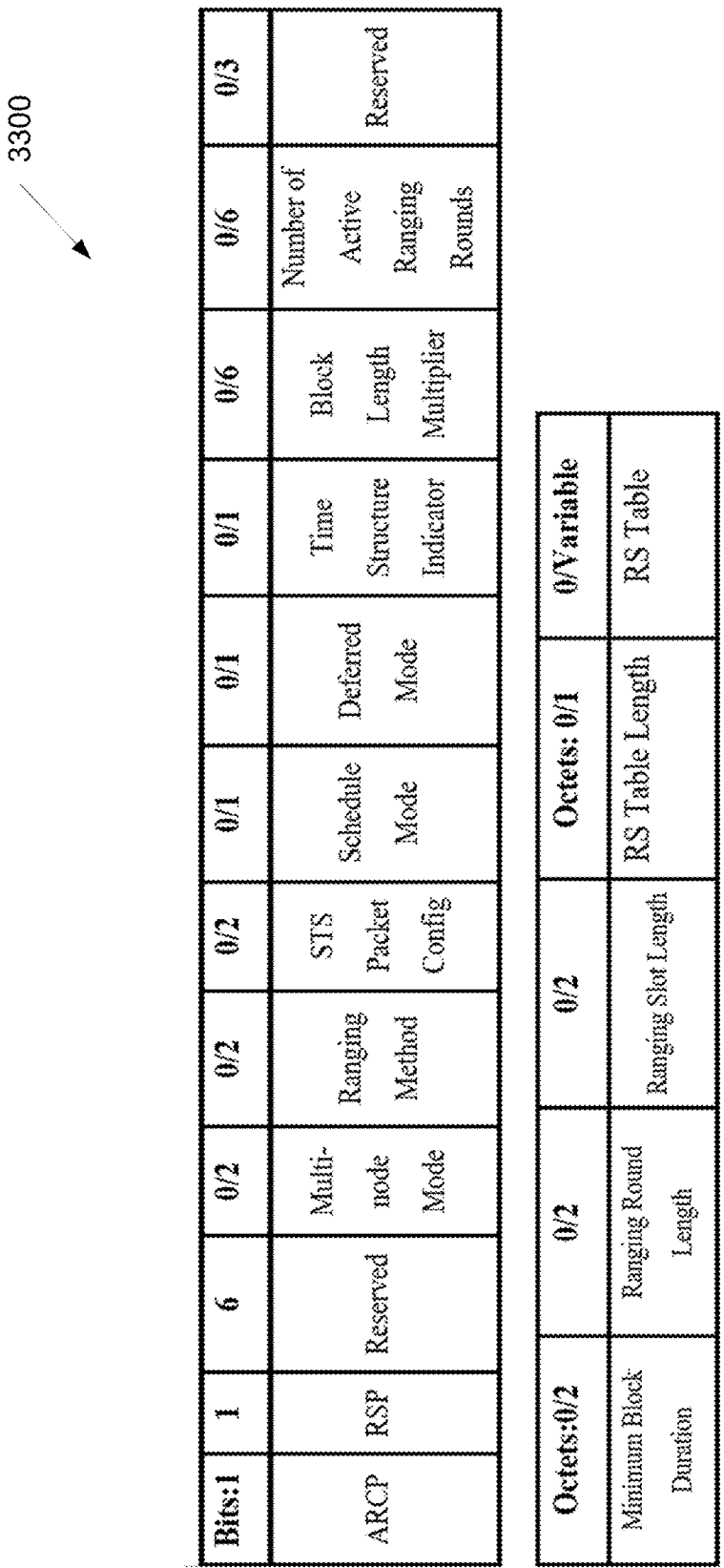
FIG. 33 illustrates an example content field format of ARC IE with ranging scheduling control according to embodiments of the present disclosure.

FIG. 33 illustrates an example content field format of ARC IE with ranging scheduling control 3300 according to embodiments of the present disclosure. The embodiment of the content field format of ARC IE with ranging scheduling control 3300 illustrated in FIG. 33 is for illustration only. FIG. 33 does not limit the scope of the present disclosure to any particular implementation.

Figure 34:
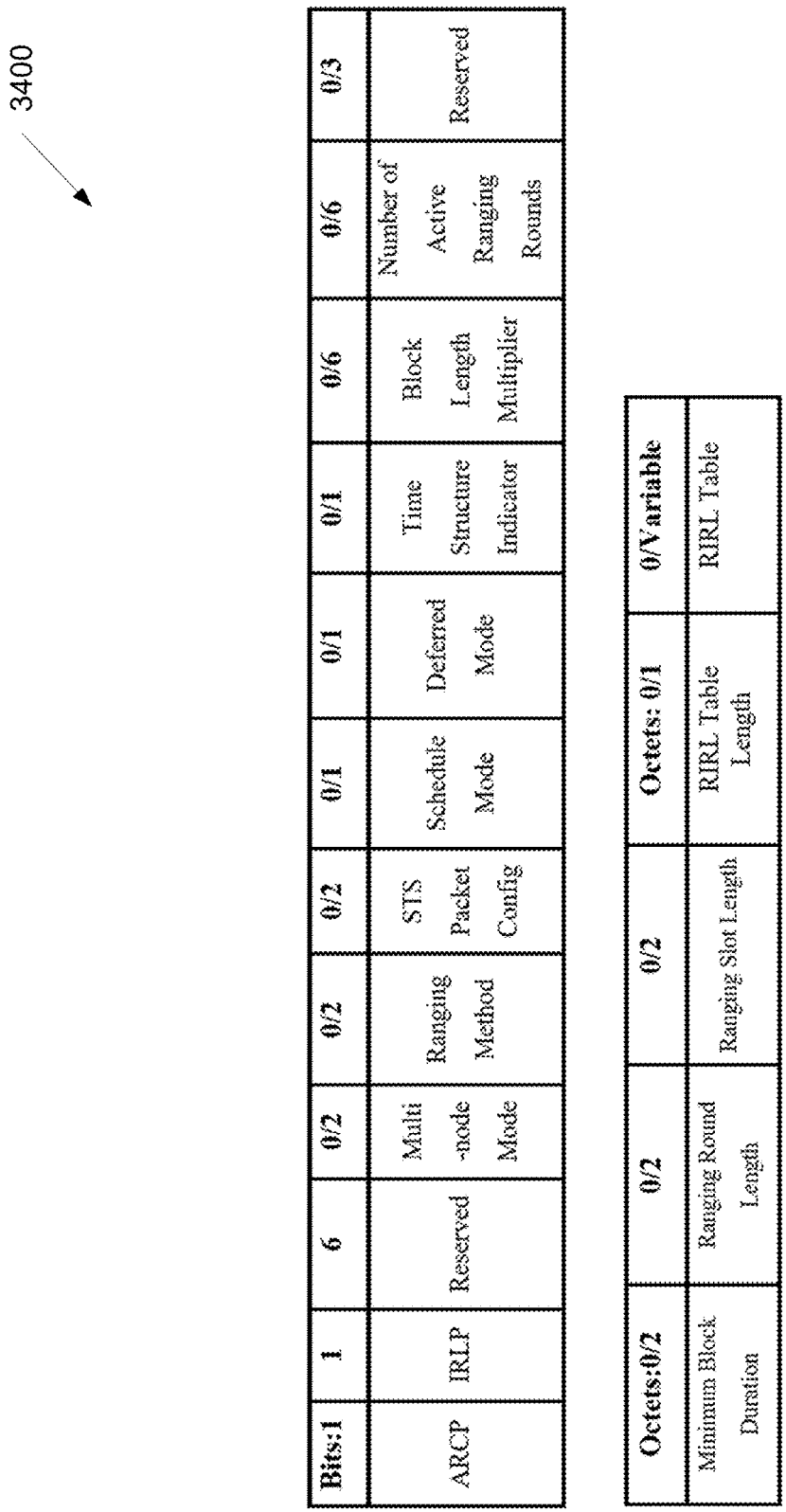
FIG. 34 illustrates an example content field format of ARC IE with initiator/responder list according to embodiments of the present disclosure.

FIG. 34 illustrates an example content field format of ARC IE with initiator/responder list 3400 according to embodiments of the present disclosure. The embodiment of the content field format of ARC IE with initiator/responder list 3400 illustrated in FIG. 34 is for illustration only. FIG. 34 does not limit the scope of the present disclosure to any particular implementation.

ARC IE may include fields from one of RIRL and RS IE. Examples of content field format are illustrated in shown in FIG. 33 and FIG. 34. In FIG. 33, the revised ARC IE content field format can provide the ranging scheduling information, while in FIG. 34, the revised ARC IE content field can provide the list of device types.

In one example of scheme 4 (S4), control flow to enable different fields of ARC IE is provided in the ranging control message (RCM).

Figure 35:
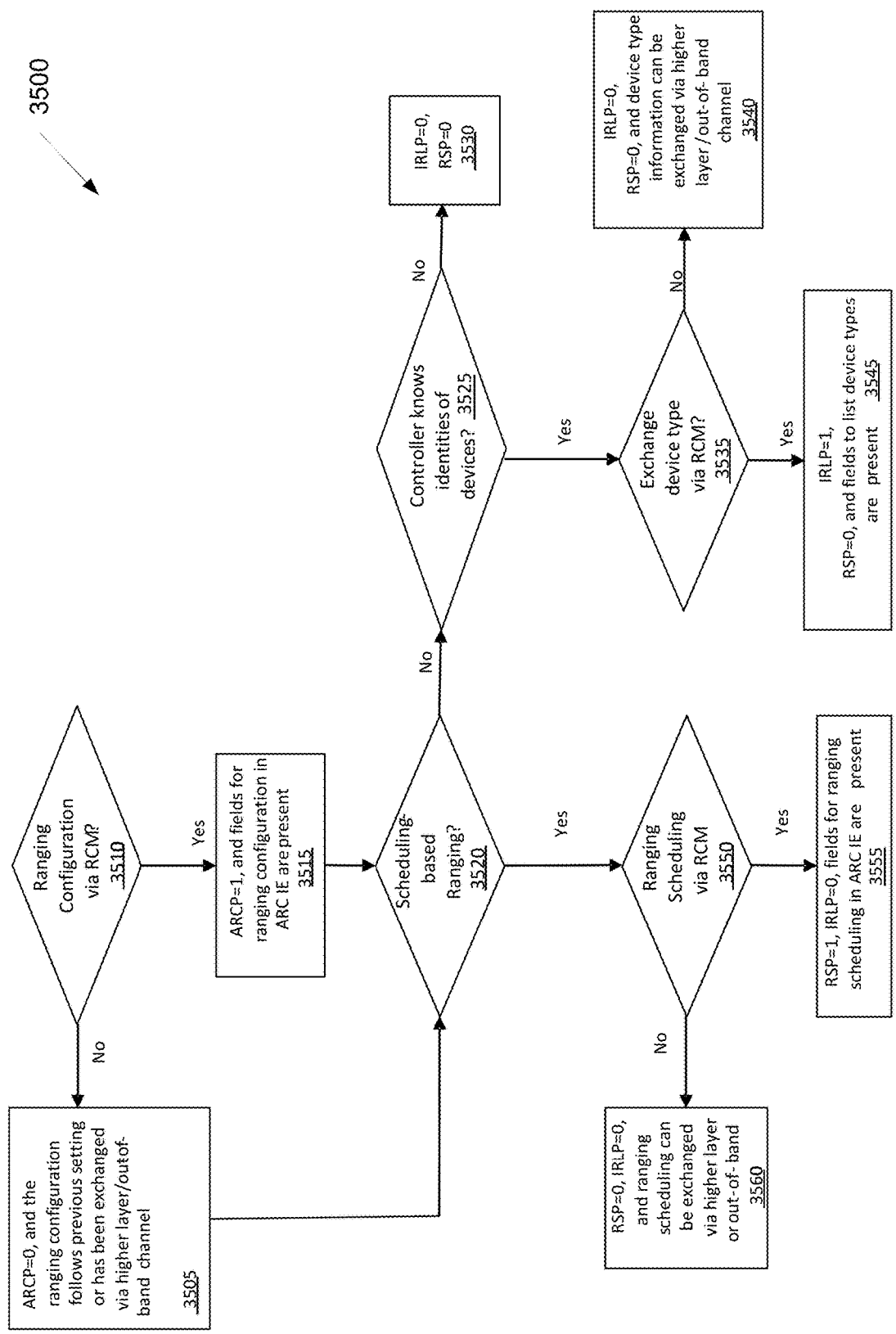
FIG. 35 illustrates an example control flow to enable fields of revised ARC IE according to embodiments of the present disclosure.

The control flow to enable different fields of revised ARC IE as shown in FIG. 32 is illustrated in FIG. 35.

FIG. 35 illustrates an example control flow 3500 to enable fields of revised ARC IE 3500 according to embodiments of the present disclosure. The embodiment of the control flow 3500 to enable fields of revised ARC IE 3500 illustrated in FIG. 35 is for illustration only. FIG. 35 does not limit the scope of the present disclosure to any particular implementation.

As illustrated in FIG. 35, the control flow 3500 begins at step 3510. In step 3510, the control flow 3500 determines whether ranging configuration via RCM is achieved. In step 3510, if the ranging configuration via RCM is achieved, the control flow performs step 3515. In step 3510, if not, the control flow 3500 performs step 3505. In step 3505, the control flow 3500 performs that ARCP=0 and the ranging configuration follows previous setting or has been exchanged via higher layer/out of-band channel, and then the control flow 3500 performs step 3520. In step 3515, the control flow 3500 performs that ARCP=1, and fields for ranging configuration in ARC IE are present. In step 3520, the control flow 3500 determines whether scheduling-based ranging is achieved. In step 3520, if the control flow 3500 is achieved, the control flow 3500 performs step 3550. In step 3550, the control flow 3500 determines whether ranging scheduling via RCM is achieved. In step 3550, if no, the control flow 3500 performs step 3560. In step 3560, the control flow 3500 performs that RSP=0, IRLP=0, and ranging scheduling can be exchanged via higher layer or out-of-band. In step 3550, the control flow 3500 determines that the ranging scheduling via RCM is achieved, the control flow 3500 performs step 3555. In step 3555, the control flow 3500 performs that RSP=1, IRLP=0, and fields for ranging scheduling in ARC IE are present. In step 3520, if not, the control flow 3500 performs step 3525. In step 3525, the control flow 3500 determines whether controller knows identities of device. In step 3525, if not, the control flow 3500 performs step 3530. In step 3530, the control flow 3500 performs that IRLP=0 and RSP=0. In step 3525, if the control flow 3500 determines that the controller knows identities of device, the control flow 3500 performs step 3535. In step 3535, the control flow 3500 determines whether device type is exchanged via RCM. If no, the control flow 3500 performs step 3540. In step 3540, the control flow 3500 performs that IRLP=0, RSP=0, and device type information can be exchanged via higher layer/out-of-band channel. In step 3535, if the control flow 3500 determines that the device type is exchanged via RCM, the control flow 3500 performs step 3545. In step 3545, the control flow 3500 performs that IRLP=1, RSP=0, and fields to list device types are present.

Figure 36:
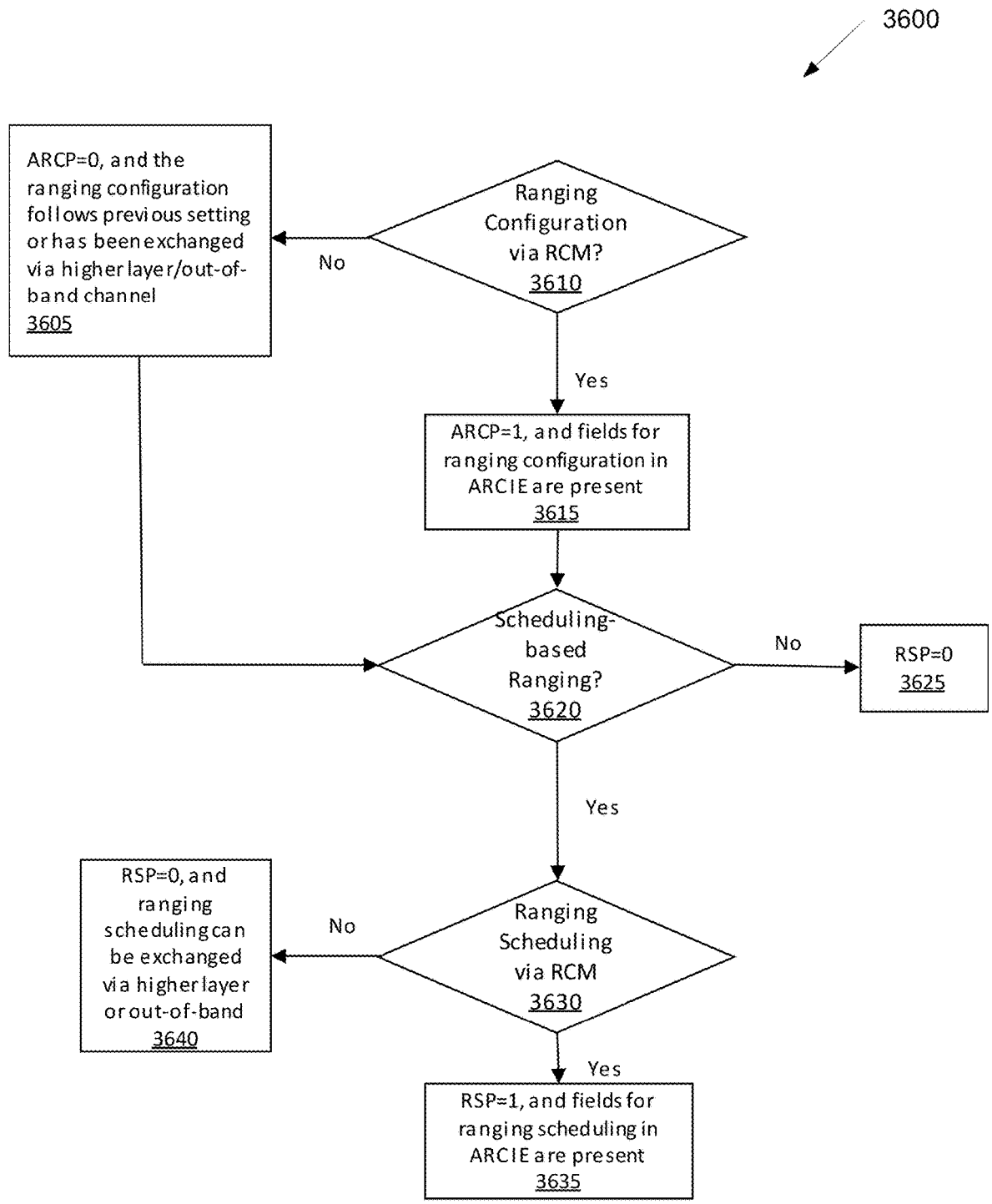
FIG. 36 illustrates another example control flow to enable fields of revised ARC IE according to embodiments of the present disclosure.

If the revised ARC IE has the content fields illustrated in FIG. 33, the control flow to enable fields of ARC IE is reduced from FIG. 35 to FIG. 36.

FIG. 36 illustrates another example control flow 3600 to enable fields of revised ARC IE 3600 according to embodiments of the present disclosure. The embodiment of the control flow 3600 to enable fields of revised ARC IE 3600 illustrated in FIG. 36 is for illustration only. FIG. 36 does not limit the scope of the present disclosure to any particular implementation.

As illustrated in FIG. 36, the control flow 3600 begins at step 3610. In step 3610, the control flow 3600 determines whether ranging configuration via RCM is achieved. In step 3610, if the ranging configuration is achieved via RCM, the control flow performs step 3615. In step 3610, if not, the control flow 3600 performs step 3605. In step 3605, the control flow 3600 performs that ARCP-0 and the ranging configuration follows previous setting or have been exchanged via higher layer/out-of-band channel, and then the control flow 3600 performs step 3620. In step 3615, the control flow 3500 performs that ARCP=1, and fields for ranging configuration in ARC IE are present. In step 3620, the control flow 3600 determines whether scheduling-based ranging is achieved. In step 3620, if not, the control flow 3600 performs step 3625. In step 3625, the control flow 3600 performs that RSP=0. In step 3620, the control flow 3600 determines that the scheduling-based ranging is performed, the control flow 3600 performs step 3630. In step 3630, the control flow 3600 determines that the ranging scheduling via RCM is achieved, the control flow 3600 performs step 3635. In step 3635, the control flow 3600 performs that RSP=1 and fields for ranging scheduling in ARC IE are present. In step 3630, if not, the control flow 3600 performs step 3640. In step 3640, the control flow 3600 performs that RSP=0 and ranging scheduling can be exchanged via higher layer or out-of-band.

Figure 37:
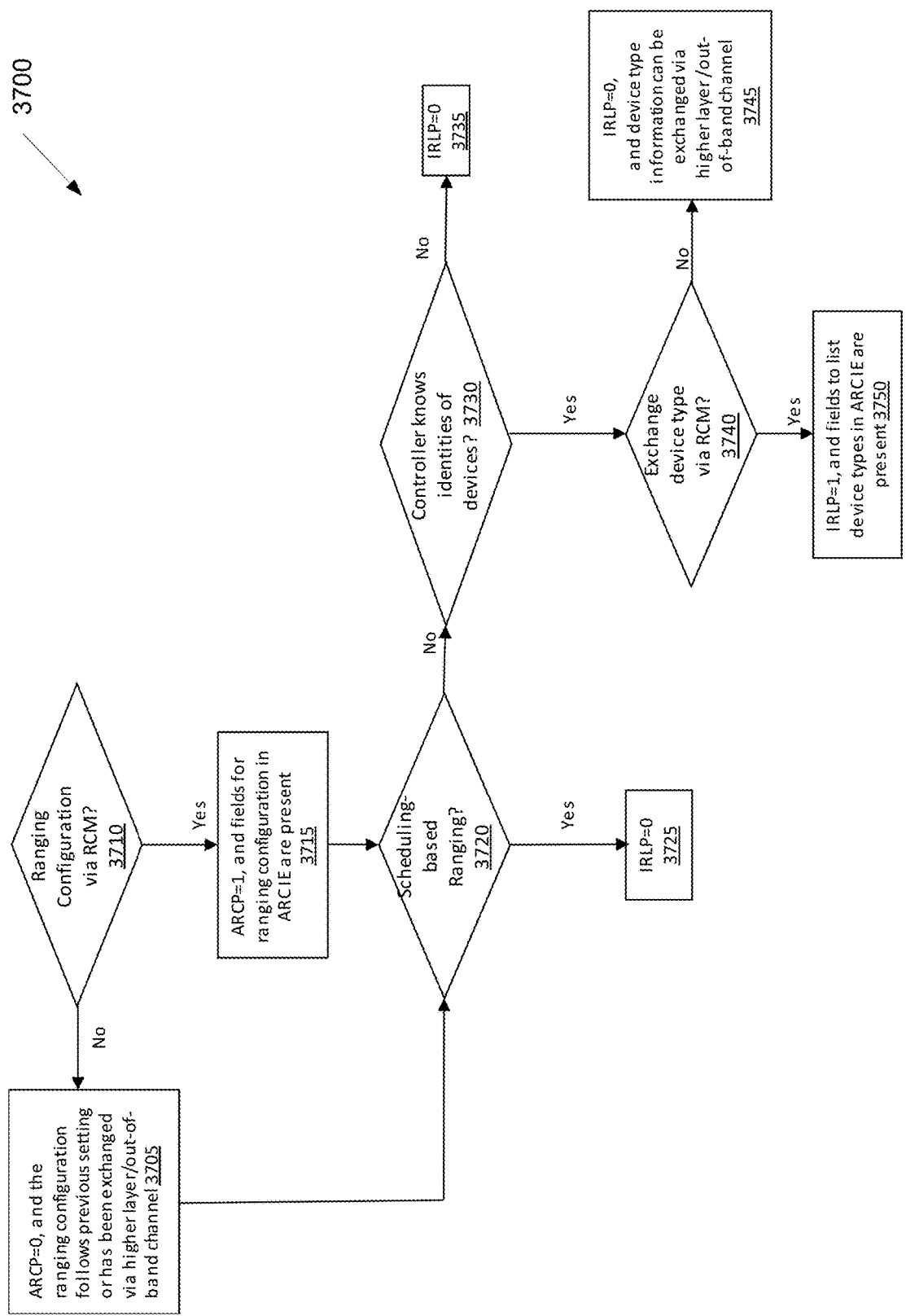
FIG. 37 illustrates an example control flow to enable fields of revised ARC IE according to embodiments of the present disclosure.

If the revised ARC IE has the content fields illustrated in FIG. 34, the control flow to enable fields of ARC IE is reduced from FIG. 35 to FIG. 37.

In one embodiment of 2 (E2), controls of initiators/responders are provided in an UWB network with mixed address type.

For an UWB network with mixed address type, e.g., 2-octet address and 8-octet address, additional bit-field can be used to indicate the address type in each element/row of RS table and RIRL table introduced in embodiment 1 (E1).

In one example of scheme 5 (S5), scheduling-based ranging is provided.

An example of the revised element of RS IE is illustrated in FIG. 38.

The first bit-field of the first octet in each element/row of RS table can be used to denote the address type. If the value of the first bit-field is 1, 2-octet short address is used, otherwise 8-octet extended address is used, or vice versa. More bits can be used to distinguish more address types, which is not precluded by the present disclosure. Another example of a revised row of RS table is illustrated in FIG. 39, where one more octet for control is introduced.

FIG. 37 illustrates an example control flow 3700 to enable fields of revised ARC IE 3700 according to embodiments of the present disclosure. The embodiment of the control flow 3700 to enable fields of revised ARC IE 3700 illustrated in FIG. 37 is for illustration only. FIG. 37 does not limit the scope of the present disclosure to any particular implementation.

As illustrated in FIG. 37, the control flow 3700 begins at step 3710. In step 3710, the control flow 3700 determines whether ranging configuration via RCM is achieved. In step 3710, if the ranging configuration via RCM is achieved, the control flow performs step 3715. In step 3710, if not, the control flow 3700 performs step 3505. In step 3705, the control flow 3700 performs that ARCP=0 and the ranging configuration follows previous setting or has been exchanged via higher layer/out of-band channel, and then the control flow 3700 performs step 3720. In step 3715, the control flow 3700 performs that ARCP=1, and fields for ranging configuration in ARC IE are present. In step 3720, the control flow 3700 determines whether scheduling-based ranging is achieved. In step 3720, if not, the control flow 3700 performs step 3725. In step 3725, the control flow 3700 performs that IRLP=0. In step 3720, if the control flow 3700 determines that the scheduling-based ranging is achieved, the control flow 3700 performs step 3730. In step 3730, the control flow 3700 determines whether controller knows identities of device. In step 3730, if not, the control flow 3700 performs step 3735. In step 3735, the control flow 3700 performs that IRLP=0. In step 3730, the control flow 3700 determines the controller knows identities of device, the control flow 3700 performs step 3740. In step 3740, the control flow 3700 determines whether device type is exchanged via RCM. If no, the control flow 3700 performs step 3745. In step 3745, the control flow 3700 performs that IRLP=0 and device type information can be exchanged via higher layer/out-of-band channel. In step 3740, if the control flow 3500 determines that the device type is exchanged via RCM, the control flow 3700 performs step 3750. In step 3750, the control flow 3700 performs that IRLP=1 and fields to list device types in ARC IE are present.

FIG. 38 illustrates an example revised row of RS table 3800 according to embodiments of the present disclosure. The embodiment of the revised row of RS table 3800 illustrated in FIG. 38 is for illustration only. FIG. 38 does not limit the scope of the present disclosure to any particular implementation.

FIG. 39 illustrates another example revised row of RS table 3900 according to embodiments of the present disclosure. The embodiment of the revised row of RS table 3900 illustrated in FIG. 39 is for illustration only. FIG. 39 does not limit the scope of the present disclosure to any particular implementation.

The content fields of FIG. 39 are similar to that of FIG. 38. The difference is that with additional octet for control in FIG. 39, some bits can be reserved for future use, while field of slot index can occupy one octet. FIG. 40 illustrate of an example of RS table element with the field of address presence.

FIG. 40 illustrates yet another example revised row of RS table 4000 according to embodiments of the present disclosure. The embodiment of the revised row of RS table 4000 illustrated in FIG. 40 is for illustration only. FIG. 40 does not limit the scope of the present disclosure to any particular implementation.

In the first octet of FIG. 40, the first bit-field is used to indicate the presence of address field: if the value of the first-bit field is one, the address field is present, otherwise it is not. Depending on the use cases and implementations, address field may not be needed if elements/rows of RS table are stacked in a predefined fixed order. Then, upon reception of RS IE, device can still know the assigned time slots.

Bit fields to control address type and/or address presence can also be included in the content field format of FIGS. 17 to 21, and FIG. 23 for various realizations of RS table element in different use cases, which is not precluded by the present disclosure.

With the function of ranging scheduling in the ARC IE as shown in the FIG. 32 and FIG. 33 of scheme 3 (S3), the revised RS table element/row in this scheme can be used to support ranging devices with mixed address types.

In one example of scheme 6 (S6), contention-based ranging is provided.

An example of the revised element of RIRL IE is illustrated in FIG. 41.

FIG. 41 illustrates an example revised row/element of RIRL table 4100 according to embodiments of the present disclosure. The embodiment of the revised row/element of RIRL table 4100 illustrated in FIG. 41 is for illustration only. FIG. 41 does not limit the scope of the present disclosure to any particular implementation.

Similar to FIG. 39, one bit-field of the first octet for control is used to denote the address type: if the value of the one bit-field is one, 2-octet short address is used, otherwise 8-octet address is used, or vice versa. More bits can be used to distinguish more address types, which is not precluded by the present disclosure. The content field of RIRL IE can follow that of FIG. 25 without address presence field or FIG. 29 with address presence field.

FIG. 42 illustrates another example revised row/element of RIRL table 4200 according to embodiments of the present disclosure. The embodiment of the revised row/element of RIRL table 4200 illustrated in FIG. 42 is for illustration only.

FIG. 42 does not limit the scope of the present disclosure to any particular implementation.

FIG. 43 illustrates an example content fields of ranging device control (RDC) IE 4300 according to embodiments of the present disclosure. The embodiment of the content fields of ranging device control (RDC) IE 4300 illustrated in FIG. 43 is for illustration only. FIG. 43 does not limit the scope of the present disclosure to any particular implementation.

To be more flexible in adjusting address presence, another example of a revised row/element of RIRL table is illustrated in FIG. 42, where the first bit-field of the first octet is used to indicate the address presence. If the value of address presence field is one, the address field is present, otherwise it is not. Depending on the use cases and implementations, some elements of RIRL IE may be stacked in a predefined order, which does not need the address field. Upon reception of the RIRL IE, device can still know ranging type in the current round. The content field of RIRL IE with the element exhibited in FIG. 38 can follow that of FIG. 25.

With the function of RIRL IE in the ARC IE as shown in the FIG. 32 and FIG. 34 of scheme 3 (S3), the revised RIRL table element/row in this scheme can be used to support ranging devices with mixed address types.

In one embodiment of 3 (E3), the function of RS IE and RIRL IE are merged into the same IE.

As aforementioned, in embodiment 1 (E1), RS IE is introduced in the Scheme 1 (S1) to control device types and time-slot allocation for scheduling-based ranging, while RIRL IE is introduced in the Scheme 2 (S2) to control device types for the contention-based ranging with known device identities. These two IEs may be merged into a single IE or include the content field format of this merged IE into the ARC IE.

In one example of scheme 7 (S7), a merged IE to control initiator/responder for scheduling/contention-based ranging is provided.

Figure 44:
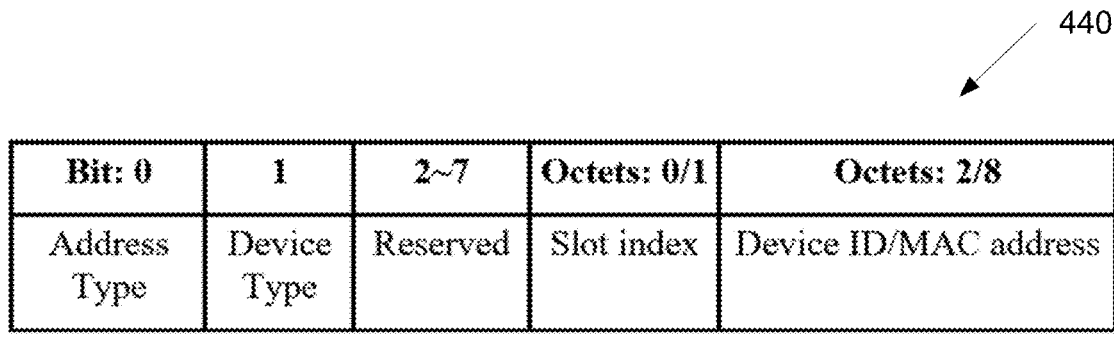
FIG. 44 illustrates an example row/element of RDC table according to embodiments of the present disclosure.

FIG. 44 illustrates an example row/element of RDC table 4400 according to embodiments of the present disclosure. The embodiment of the row/element of RDC table 4400 illustrated in FIG. 44 is for illustration only. FIG. 44 does not limit the scope of the present disclosure to any particular implementation.

The merged IE of RS and RIRL IE can be called ranging device control (RDC) IE, while other appropriate term(s) can also be used. An example of the RDC IE content field format is illustrated in FIG. 43 and FIG. 44.

In one embodiment, the RDC IE is used as a ranging device management (RDM IE). In other words, the RDC IE is compatible with the RDM IE. In the present disclosure, the RDC IE and the RDM IE are commonly used.

The first bit-field of FIG. 43 is to indicate the slot index presence (SIP). If the value of SIP is one, RDC IE is equivalent to the RS IE in the Scheme 1 (S1) of the Embodiment 1 (E1), where the RDC table length is the number of time slots assigned to ranging devices, and the slot index field of each element in RDC table is present. If the value of SIP is zero, RDC IE is reduced to the RIRL IE in the scheme 2 (S2) of the embodiment 2 (E2), where the RDC table length becomes the number of ranging devices selected to participate in the ranging round, and the slot index field of each element in RDC table is not present.

In one embodiment, the SIP is used as a slot index used (SIU). In other words, the SIP is compatible with the SIU. In the present disclosure, the SIP and the SIU are commonly used.

If the address field of each element in the RDC table can be determined by DstAddrMode of MCPS-DATA.request, the address type field is not needed, and FIG. 44 is reduced to FIG. 41.

Figure 45:
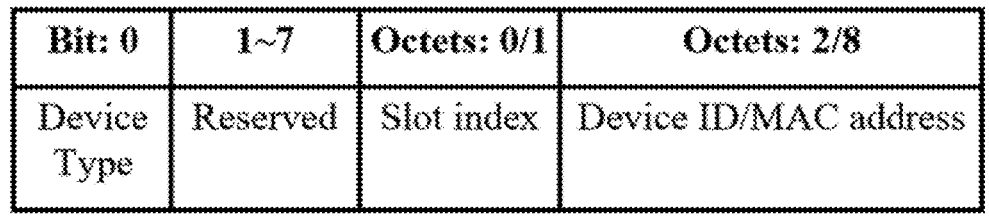
FIG. 45 illustrates another example row/element of RDC table according to embodiments of the present disclosure.

FIG. 45 illustrates another example row/element of RDC table 4500 according to embodiments of the present disclosure. The embodiment of the row/element of RDC table 4500 illustrated in FIG. 45 is for illustration only. FIG. 45 does not limit the scope of the present disclosure to any particular implementation.

Figure 46:
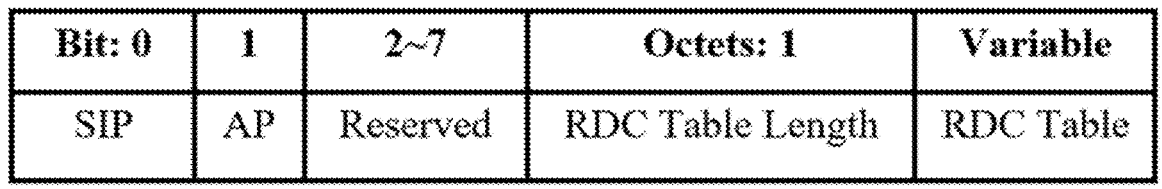
FIG. 46 illustrates an example content fields of ranging device control (RDC) IE with address presence field according to embodiments of the present disclosure.

FIG. 46 illustrates an example content fields of ranging device control (RDC) IE with address presence field 4600 according to embodiments of the present disclosure. The embodiment of the content fields of ranging device control (RDC) IE with address presence field 4600 illustrated in FIG. 46 is for illustration only. FIG. 46 does not limit the scope of the present disclosure to any particular implementation.

Depending on the use cases and implementations, elements of RDC IE may be stacked in a predefined order, which does not need the address field. To include the control of address presence, a bit field can be added to RDC IE as illustrated in FIG. 46.

Figure 47:
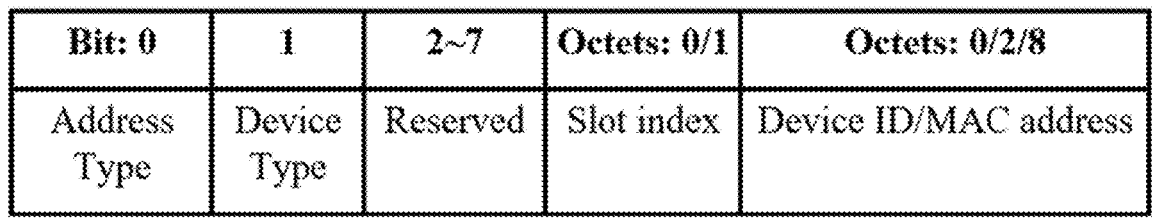
FIG. 47 illustrates an example row/element of RDC table with address type field according to embodiments of the present disclosure.

FIG. 47 illustrates an example row/element of RDC table with address type field 4700 according to embodiments of the present disclosure. The embodiment of the row/element of RDC table with address type field 4700 illustrated in FIG. 47 is for illustration only. FIG. 47 does not limit the scope of the present disclosure to any particular implementation.

FIG. 48 illustrates an example row/element of RDC table without address type field 4800 according to embodiments of the present disclosure. The embodiment of the row/element of RDC table without address type field 4800 illustrated in FIG. 48 is for illustration only. FIG. 48 does not limit the scope of the present disclosure to any particular implementation.

In the first octet for control, the first bit-field is used to indicate slot index presence (SIP) of each RDC table element, while the second bit-field is address presence (AP) used to denote whether the address field is present in each element of RDC Table or not. If value of AP is one, the address field of RDC table element is present, otherwise it is not. Examples of a row/element in FIG. 46 are illustrated in FIG. 47 and FIG. 48.

Alternatively, the content field of RDC IE can remain the same as that of FIG. 39, while an address presence (AP) field can be fulfilled by one of reserved bits in each element of RDC table as shown in FIG. 47 or FIG. 48.

In one embodiment of scheme 8 (S8), the control of initiator/responder is included for scheduling/contention-based ranging in ARC IE. Similar to scheme 3 (S3) of embodiment 1 (E1), the function of RDC IE can be included in the ARC IE. Examples of the revised content field format are illustrated in FIG. 49 and FIG. 51.

FIG. 49 illustrates an example content field format of ARC IE with fields of RDC IE 4900 according to embodiments of the present disclosure. The embodiment of the content field format of ARC IE with fields of RDC IE 4900 illustrated in FIG. 49 is for illustration only. FIG. 49 does not limit the scope of the present disclosure to any particular implementation.

Figure 50:
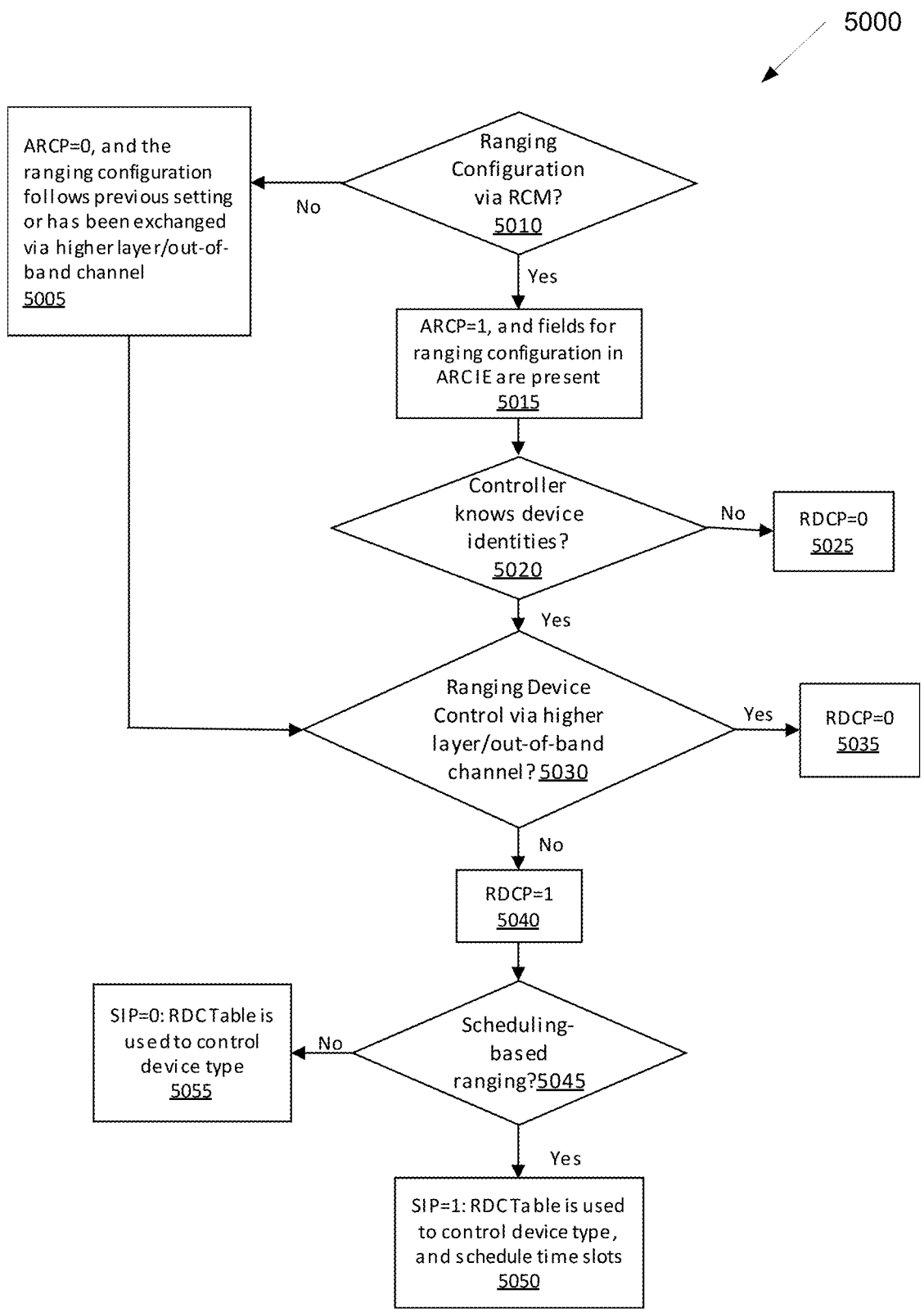
FIG. 50 illustrates an example control flow to enable fields of revised ARC IE according to embodiments of the present disclosure.

FIG. 50 illustrates an example control flow 5000 to enable fields of revised ARC IE 5000 according to embodiments of the present disclosure. The embodiment of the control flow 5000 to enable fields of revised ARC IE 5000 illustrated in FIG. 50 is for illustration only. FIG. 50 does not limit the scope of the present disclosure to any particular implementation.

As illustrated in FIG. 50, the control flow 5000 begins at step 5010. In step 5010, the control flow 5000 determines whether ranging configuration via RCM is achieved. In step 5010, if the ranging configuration is achieved via RCM, the control flow 5000 performs step 5015. In step 5010, if not, the control flow 5000 performs step 5005. In step 5005, the control flow 5000 performs that ARCP-0 and the ranging configuration follows previous setting or has been exchanged via higher layer/out of-band channel, and then the control flow 5000 performs step 5030. In step 5015, the control flow 5000 performs that ARCP=1, and fields for ranging configuration in ARC IE are present. In step 5020, the control flow 5000 determines whether controller knows device identities. In step 5020, if not, the control flow 5000 performs step 5025. In step 5025, the control flow 5000 performs that RDCP=0. In step 5020, if the controller knows device identities, the control flow 5000 performs step 5030. In step 5030, the control flow 5000 determines whether ranging device control via higher layer/out-of-band channel is achieved. Inf step 5030, if not, the control flow 5000 performs step 5035. In step 5035, the control flow 5000 performs that RDCP=0. In step 5030, if the ranging device control via higher layer/out-of-band channel is achieved, the control flow 5000 performs step 5040. In step 5040, the control flow 5000 performs that RDCP=1. In step 5045, the control flow 5000 determines whether scheduling-based ranging is achieved. In step 5045, if not, the control flow 5000 performs step 5055. In step 5055, the control flow 5000 performs that SIP=0: RDCT table is used to control device type. In step 5045, if the scheduling-based ranging is achieved, the control flow 5000 performs step 5050. In step 5050, the control flow 5000 performs that SIP-1: RDCT table is used to control device type, and scheduling time slots.

FIG. 51 illustrates an example content field format of ARC IE with fields of RDC IE 5100 according to embodiments of the present disclosure. The embodiment of the content field format of ARC IE with fields of RDC IE 5100 illustrated in FIG. 51 is for illustration only. FIG. 51 does not limit the scope of the present disclosure to any particular implementation.

FIG. 52 illustrates an example row element of RDC table with one octet to indicate device type and slot index 5200 according to embodiments of the present disclosure. The embodiment of the element of RDC table with one octet to indicate device type and slot index 5200 illustrated in FIG. 52 is for illustration only. FIG. 52 does not limit the scope of the present disclosure to any particular implementation.

As illustrated in FIG. 49, the revised content field format of ARC IE includes an octet for control in the beginning, where the first bit-field is used for advanced ranging control presence (ARCP) and the second bit-field is used for ranging device control presence (RDCP). An example of RDC table row/element is illustrated in FIG. 44 (with address type field) or FIG. 45 (without address type field).

If the value of ARCP field is one, the following fields for ranging configuration are present, including multi-node mode, ranging method, STS packet config, schedule mode, deferred mode, Time Structure Indicator, block length multiplier, Number of Active ranging rounds, 3-bit reserved field, Minimum block duration, ranging round length, ranging slot length. Otherwise, these fields are not present. In the development of IEEE 802.15.4z, changes of content field format in the ARC IE for ranging configuration are not precluded by the present disclosure. Whether these fields are present or not can be indicated by the ARCP field.

If the value of RDCP field is one, the fields to fulfill ranging device control are present, including SIP, RDC table length, and RDC table. Otherwise, these fields are not present These fields can be used alone if ranging configuration has already been exchanged before. These fields can also be along with the fields for ranging configuration when value of ARCP is 1: when value of schedule mode is 1, the value of SIP is 1 for scheduling-based ranging; when value of schedule mode field is zero, the value of SIP may be zero for contention-based ranging with known device identities. If the value of RDCP field is 0, fields of SIP, RDC table length and RDC table are not present. The control flow to enable different fields of revised ARC IE as shown in FIG. 49 is illustrated in FIG. 50.

In FIG. 51, an address presence (AP) field is introduced to indicate the presence of the address field in each element of RDC table. Compared with the content field format of FIG. 49, other fields of FIG. 51 remain the same. An example of RDC table row/element is illustrated in FIG. 47 (with address type field) or FIG. 48 (without address type field). The control flow to enable different fields of revised ARC IE as shown in FIG. 51 is similar to that of FIG. 50. The AP field value is set to be one if address field is needed in each row/element of RDC table, otherwise AP field value is zero.

In one embodiment of scheme 9 (S9), ranging device control IE with simplified structure is provided.

The ranging device control IE as shown in FIG. 43 and FIG. 45 uses one octet per row element to indicate the device type. However, the fields of device type and slot index can also be merged into one octet as shown in the FIG. 49, while the RDC IE content field format remain the same as that in the FIG. 43.

If the SIP field value in the FIG. 43 is 0, Bit 1-7 of the first octet in each row element of the RDC table are reserved, and Bit 0 is used to indicate the device type, i.e., ranging initiator or responder. The number of row elements equals the number of participated ranging devices. The RDC IE can be conveyed in the ranging control message (RCM) as shown in FIG. 22 and FIG. 24, which is used to assign device types for the contention-based ranging with known device identities.

If the SIP field value in the FIG. 42 is 1, Bit 1-7 of the first octet in each row element of the RDC table are used as the slot index, which denotes a particular slot assigned to the device specified the address field, while the device type is denoted by the first bit, i.e., Bit 0. The number of row elements equals the number of assigned time slots. The RDC IE can be conveyed in the ranging control message (RCM) at the beginning of the ranging round, or in a ranging frame or data message transmitted by the controller within a ranging round, as shown in FIG. 24. It is used to assign device types and time slots for the scheduling-based ranging with known device identities.

The time-slot structure as shown in the FIG. 9 is configured via the exchange of the RCM. The starting time refers to the exchange of the RCM, which may be conveyed in the first slot, i.e., slot 0, of a ranging round. RCM may not be transmitted at the beginning of slot 0, and the transmission offset relative to the start of the slot may also be exchanged in the RCM or via the out-of-band mechanism. With the configured slot duration and assigned slot indices, a ranging controlee know time periods to transmit ranging frame or data message.

The address type of each row element in the RDC table can be determined by the DstAddrMode in the MCPS-DATA.Indication. If the message with RDC IE contains a 2-octet (or 8-octet) address in the destination address field of the MHR, the address type of each row element in the RDC table may also be 2-octet (or 8-octet).

FIG. 53 illustrates a flowchart of a method 5300 for controlling a ranging operation according to embodiments of the present disclosure, as may be performed by a transmit apparatus (e.g. at least one apparatus in either group 1 or group 2 as illustrated in FIG. 6). The embodiment of the method 5300 illustrated in FIG. 53 is for illustration only. FIG. 53 does not limit the scope of the present disclosure to any particular implementation.

As illustrated in FIG. 53, the method 5300 begins at step 5302. In step 5302, a transmit apparatus identifies ranging apparatuses. In step 5305, the transmit apparatus identifies a ranging control message (RCM) including a ranging device management information element (RDM IE) and roles of the ranging apparatuses, the RDM IE including a content field, wherein the ranging apparatuses include the transmit apparatus and at least one receive apparatus In one embodiment, the content field of the RDM IE includes a field for a slot index used (SIU), a field for an RDC table length, and a field for an RDC table. In one embodiment, the field for the SIU indicates whether a slot index field of the RDC table is used. In one embodiment, the field for the RDC table length indicates a number of elements in the field for the RDC table.

In such embodiment, the RDC table comprises row elements each of which comprises a field for a ranging role, a field for a slot index, and a field for an address. In such embodiment, the field for the ranging role indicates the role of ranging apparatuses as an initiator or a responder; the field for the slot index, in a scheduling-based ranging mode, identifies the ranging apparatuses when the field for the SIU is set to one; in a contention-based ranging, the field for the SIU is set to zero indicating that the field for the slot index is reserved and not used; and the field for the address identifies each of the ranging apparatuses.

In step 5315, the transmit apparatus transmits, to the ranging apparatuses over a broadcast channel, the RCM including the RDM IE in a ranging round (RR).

In one embodiment, the transmit apparatus is configured to transmit the RCM at a beginning of the RR or in a ranging frame; or transmit a message conveying information associated with the RCM in the RR.

In one embodiment, the transmit apparatus is further configured to receive a higher layer signaling including the RDM IE.

In one embodiment, the transmit apparatus is further configured to identify an advanced ranging control IE (ARC IE) comprising a ranging scheduling mode that indicates a contention-based ranging mode or a scheduling-based ranging mode, the scheduling assignment and the roles of ranging apparatuses are exchanged via the RDM IE for following RRs in the scheduling-based ranging mode.

In such embodiment, the RDM IE is used for the contention-based ranging mode to determine the roles of ranging apparatuses based on capability of the transmit apparatus to identify the ranging apparatuses, and the RDM IE is used to exchange information associated with the roles of ranging apparatuses.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A controller device in a wireless communication system, the controller device comprising:
a processor configured to
identify ranging devices participating in a multi-node ranging and roles of the ranging devices; and
a transceiver operably coupled to the processor, the transceiver configured to transmit, to plurality of controlees, a ranging control message (RCM) comprising information indicating addresses for the ranging devices and information indicating the roles of the ranging devices, the roles of the ranging devices including one or more initiators or one or more responders,
wherein the processor is further configured to perform, based on the RCM, a ranging with at least one ranging device among the ranging devices.

2. The controller device of claim 1, wherein the ranging comprises one of a scheduling-based ranging or a contention-based ranging for the ranging devices.

3. The controller device of claim 2, wherein the RCM comprises, in case that the scheduling-based ranging is performed, an information element (IE) comprising information indicating the ranging devices, information indicating roles, and resource assignment information for the ranging devices.

4. The controller device of claim 3, wherein the IE comprises:
a first field comprising the information indicating the ranging devices and the information indicating the roles and resource assignment information; and
a second field comprising information indicating a number of elements in the first field.

5. The controller device of claim 4, wherein the number of elements in the first field indicates a number of time slots in a ranging round.

6. The controller device of claim 4, wherein each of the first field comprises:
a slot index field for a time slot that is scheduled for a ranging device;
an address field for identifying the ranging device; and
a field for indicating a role of the ranging device.

7. The controller device of claim 6, wherein:
in case that a value of the field for indicating the role of the ranging device is set to a zero, the role of the ranging device is determined as a responder; and
in case that the value of the field for indicating the role of the ranging device is not set to the zero, the role of the ranging device is determined as an initiator.

8. The controller device of claim 2, wherein the RCM comprises, in case that the contention-based ranging is performed, an information element (IE) comprising the information indicating the ranging devices and the information indicating the roles of the ranging devices.

9. The controller device of claim 8, wherein the IE comprises:

a first field comprising the information indicating the ranging devices and the information indicating the roles of the ranging devices; and a second field indicating a number of elements in the first field.

10. The controller device of claim 9, wherein the number of elements in the first field indicates a number of the ranging devices.

11. The controller device of claim 9, wherein each element of the first field comprises:

an address field for identifying a ranging device; and a field for indicating a role of the ranging device.

12. The controller device of claim 11, wherein:

in case that a value of the field for indicating the role of the ranging device is set to a zero, the role of the ranging device is determined as a responder; and in case that the value of the field for indicating the role of the ranging device is not set to the zero, the role of the ranging device is determined as an initiator.

13. The controller device of claim 2, wherein the RCM further comprises an advanced ranging control (ARC) IE including:

a multi-node mode field indicating that the ranging is the multi-node ranging involving a plurality of devices; and a scheduling mode field indicating whether the scheduling-based ranging is performed or the contention-based ranging is performed.

14. A method of a controller device in a wireless communication system, the method comprising:

identifying ranging devices participating in a multi-node ranging and roles of the ranging devices;

transmitting, to a plurality of controlees, a ranging control message (RCM) comprising information indicating addresses for the ranging devices and information indicating the roles of the ranging devices, wherein the roles of the ranging devices include one or more initiators or one or more responders; and performing, based on the RCM, a ranging with at least one ranging device among the ranging devices.

15. The method of claim 14, wherein the ranging comprises one of a scheduling-based ranging or a contention-based ranging for the ranging devices.

16. The method of claim 15, wherein the RCM comprises, in case that the scheduling-based ranging is performed, an information element (IE) comprising information indicating the ranging devices, information indicating roles, and resource assignment information for the ranging devices.

17. The method of claim 16, wherein the IE comprises:

a first field comprising the information indicating the ranging devices and the information indicating the roles and resource assignment information; and a second field comprising information indicating a number of elements in the first field.

18. The method of claim 17, wherein the number of elements in the first field indicates a number of time slots in a ranging round.

19. The method of claim 17, wherein each element of the first field comprises:

a slot index field for a time slot that is scheduled for a ranging device;

an address field for identifying the ranging device; and a field for indicating a role of the ranging device.

20. The method of claim 19, wherein:

in case that a value of the field for indicating the role of the ranging device is set to a zero, the role of the ranging device is determined as a responder; and in case that the value of the field for indicating the role of the ranging device is not set to the zero, the role of the ranging device is determined as an initiator.

21. The method of claim 15, wherein the RCM comprises, in case that the contention-based ranging is performed, an information element (IE) comprising the information indicating the ranging devices and the information indicating the roles of the ranging devices.

22. The method of claim 21, wherein the IE comprises:

a first field comprising the information indicating the ranging devices and the information indicating the roles of the ranging devices; and a second field indicating a number of elements in the first field.

23. The method of claim 22, wherein the number of elements in the first field indicates a number of the ranging devices.

24. The method of claim 22, wherein each element of the first field comprises:

an address field for identifying a ranging device; and a field for indicating a role of the ranging device.

25. The method of claim 24, wherein:

in case that a value of the field for indicating the role of the ranging device is set to a zero, the role of the ranging device is determined as a responder; and in case that the value of the field for indicating the role of the ranging device is not set to the zero, the role of the ranging device is determined as an initiator.

26. The method of claim 15, wherein the RCM further comprises an advanced ranging control (ARC) IE including:

a multi-node mode field indicating that the ranging is the multi-node ranging involving a plurality of devices; and a scheduling mode field indicating whether the scheduling-based ranging is performed or the contention-based ranging is performed.

* * * * *